(12) United States Patent
Wang et al.

(10) Patent No.: US 7,203,255 B2
(45) Date of Patent: Apr. 10, 2007

(54) METHOD AND SYSTEM TO IMPLEMENT NON-LINEAR FILTERING AND CROSSOVER DETECTION FOR PILOT CARRIER SIGNAL PHASE TRACKING

(75) Inventors: Yi-Hsiu Wang, Palo Alto, CA (US); Teresa H. Meng, Portola Valley, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 922 days.

(21) Appl. No.: 10/076,854

(22) Filed: Feb. 15, 2002

(65) Prior Publication Data

US 2003/0112825 A1    Jun. 19, 2003

Related U.S. Application Data

(63) Continuation-in-part of application No. 10/076,022, filed on Feb. 14, 2002.

(51) Int. Cl.
*H04L 27/06* (2006.01)

(52) U.S. Cl. ...................... 375/340; 370/491

(58) Field of Classification Search .............. 375/259, 375/260, 285, 324, 327, 340, 342, 355, 356, 375/365, 347–348, 350; 370/210, 350, 503, 370/510, 491, 485
See application file for complete search history.

(56) References Cited

U.S. PATENT DOCUMENTS

| | | | |
|---|---|---|---|
| 5,583,886 A | 12/1996 | Rohani et al. ............... 375/227 |
| 5,745,535 A | 4/1998 | Mori | |
| 5,770,971 A | 6/1998 | McNicol ..................... 330/52 |
| 5,799,047 A | 8/1998 | Dobrica ....................... 375/350 |
| 5,818,872 A * | 10/1998 | Gupta .......................... 375/222 |
| 6,151,313 A | 11/2000 | Abramson | |
| 6,310,925 B1 | 10/2001 | Kitta | |
| 6,359,938 B1 * | 3/2002 | Keevill et al. ............... 375/316 |
| 6,549,561 B2 | 4/2003 | Crawford | |
| 6,549,583 B2 * | 4/2003 | Crawford .................... 375/260 |
| 6,625,231 B1 | 9/2003 | Shen | |
| 6,628,738 B1 * | 9/2003 | Peeters et al. ............... 375/371 |
| 6,633,616 B2 | 10/2003 | Crawford | |
| 6,643,339 B1 | 11/2003 | Okanoue et al. | |
| 6,680,932 B1 | 1/2004 | Hsuan et al. | |
| 6,711,221 B1 * | 3/2004 | Belotserkovsky et al. .. 375/355 |
| 6,728,301 B1 | 4/2004 | Chrisikos | |
| 6,738,375 B1 | 5/2004 | Okanoue | |
| 6,928,120 B1 | 8/2005 | Zhang | |
| 6,940,932 B2 * | 9/2005 | Henriksson .................. 375/347 |
| 6,940,933 B1 * | 9/2005 | Heinonen et al. ........... 375/354 |
| 6,944,122 B2 | 9/2005 | Shirakata et al. | |
| 6,963,619 B1 * | 11/2005 | Gesbert et al. .............. 375/267 |
| 2002/0065047 A1 | 5/2002 | Moose | |

OTHER PUBLICATIONS

John L. Stensby, "Phase-Locked Loops: Theory and Applications", Jun. 19, 1997, Publisher CRC.*

* cited by examiner

*Primary Examiner*—Khanh Tran
(74) *Attorney, Agent, or Firm*—Bever, Hoffman & Harms, LLP; Jeanette S. Harms

(57) ABSTRACT

Systems and methods for correcting phase ambiguity in a total pilot phase value are presented. Examples include comparing and correcting total pilot phase values having different pilot frequencies within the same sampling interval, such as the same data symbol. Another example includes correcting a total pilot phase value for one sampling interval and corresponding to one pilot frequency using nonlinear filtering of values of the total pilot phase for prior sampling intervals at the same pilot frequency.

54 Claims, 11 Drawing Sheets

METHOD AND SYSTEM TO IMPLEMENT NON-LINEAR FILTERING AND CROSSOVER DETECTION FOR PILOT CARRIER SIGNAL PHASE TRACKING

CROSS REFERENCE TO RELATED APPLICATIONS

The present application is a continuation in part of U.S. application Ser. No. 10/076,022, filed Feb. 14, 2002, entitled "An Efficient Pilot Tracking Method For OFDM Receivers".

FIELD OF THE INVENTION

The present invention is directed to communication systems and networks and the area of pilot tracking. More particularly, the present invention relates to implementing techniques such as non-linear filtering and crossover detection algorithms in the tracking of pilot signals in order to maintain an accurate channel estimate despite the presence of magnitude changes, phase noise, frequency offset between a receiver and transmitter, and timing drift.

BACKGROUND

The market for home networking is developing at a phenomenal rate. Service providers from cable television, telephony and digital subscriber line markets are vying to deliver bundled services such as basic telephone service, Internet access and entertainment directly to the consumer. Collectively these services require a high-bandwidth network that can deliver 30 Mbits/s or even higher rates. The Institute of Electrical and Electronic Engineers (IEEE) 802.11a standard describes a cost-effective, robust, high-performance local-area network (LAN) technology for distributing this multimedia information within the home. Networks that will operate in accordance with standard 802.11a will use the 5-GHz UNII (unlicensed National Information Infrastructure) band and may achieve data rates as high as 54 Mbits/s, a significant improvement over other standards-based wireless technologies. The 802.11a standard has some unique and distinct advantages over other wireless standards in that it uses orthogonal frequency-division multiplexing (OFDM) as opposed to spread spectrum, and it operates in the clean band of frequencies at 5 GHz.

OFDM is a technology that resolves many of the problems associated with the indoor wireless environment. Indoor environments such as homes and offices are difficult because the radio system has to deal with a phenomenon called "multipath." Multipath is the effect of multiple received radio signals coming from reflections off walls, ceilings, floors, furniture, people and other objects. In addition, the radio has to deal with another frequency phenomenon called "fading," where blockage of the signal occurs due to objects or the position of a communications device (e.g., telephone, TV) relative to the transceiver that gives the device access to the cables or wires of the cable TV, telephone or internet provider.

OFDM has been designed to deal with these phenomena and at the same time utilize spectrum more efficiently than spread spectrum to significantly increase performance. Ratified in 1999, the IEEE 802.11a standard significantly increases the performance (54 Mbits/s vs. 11 Mbits/s) of indoor wireless networks.

The ability of OFDM to deal with multipath and fading is due to the nature of OFDM modulation. OFDM modulation is essentially the simultaneous transmission of a large number of narrow band carriers, sometimes called subcarriers, each modulated with a low data rate, but the sum total yielding a very high data rate. FIG. 1a illustrates the frequency spectrum of multiple modulated subcarriers in an OFDM system. To obtain high spectral efficiency, the frequency response of the subcarriers are overlapping and orthogonal, hence the name OFDM. Each narrowband subcarrier can be modulated using various modulation formats such as binary phase shift keying (BPSK), quaternary phase shift keying (QPSK) and quadrature amplitude modulation QAM (or the differential equivalents). The 802.11a standard specifies that each 20 MHz channel has 52 subcarriers covering 16.5 MHz of the 20 MHz, leaving 3.5 MHz to be used for preventing interference between channels.

Since the modulation rate on each subcarrier is very low, each subcarrier experiences flat fading in multipath environments and is relatively simple to equalize, where coherent modulation is used. The spectrums of the modulated subcarriers in an OFDM system are not separated but overlap. The reason why the information transmitted over the carriers can still be separated is the so-called orthogonality relation giving the method its name. The orthogonality relation of the subcarriers requires the subcarriers to be spaced in such a way that at the frequency where the received signal is evaluated all other signals are zero. In order for this orthogonality to be preserved it helps for the following to be true:

1. Synchronization of the receiver and transmitter. This means they should assume the same modulation frequency and the same time-scale for transmission (which usually is not the case).
2. The analog components, part of transmitter and receiver, are of high quality.
3. The multipath channel needs to be accounted for by placing guard intervals which do not carry information between data symbols. This means that some parts of the signal cannot be used to transmit information.

The IEEE 802.11a standard defines the structure of a packet that is used for information transmission between two transceivers. A receiver derives timing information, data, and other information from the packet. For example, the first 10 symbols (t1 to t10) in the packet are referred to as the shorts; repeated random sequences that a receiver uses for detecting symbol timing and coarse carrier frequency offset. A guard interval (GI1) follows the shorts and acts as a rough inter-symbol boundary for absorbing the effect of multipath. The guard interval is made long enough such that if short symbol t10 undergoes multipath, symbol t10 will partially "smear" into GI1 without affecting the first long symbol (T1) that follows the shorts. A receiver may receive noise that may cause the receiver to commence processing of the noise as though it were the start of the short symbols. If the receiver fails to detect the false detection relatively quickly, there is the possibility that the receiver will continue to process the noise and fail to process a legitimate packet. U.S. application Ser. No. 09/962,928, filed Sep. 24, 2001, entitled "Detection of a False Detection of a Communication Packet," describes methods and systems for detecting the false detection of the start of a packet, thereby, allowing the receiver to return relatively quickly to waiting for a legitimate packet.

If the receiver and transmitter are not synchronized as in (1) above, the orthogonality of the subcarriers is compromised and data imposed on a subcarrier may be not be recovered accurately due to inter-carrier interference. FIG. 1b illustrates the effect of the lack of synchronization on the frequency spectrum of multiple subcarriers. The dashed lines show where the spectrum for the subcarrier should be, and the solid lines shows where the spectrum falls due to the lack of synchronization. Since the receiver and transmitter need to be synchronized for reliable OFDM communication to occur, but in fact in practice they do not, it is necessary to compensate for the offset between the receiver and the transmitter. The offset can occur due to the inherent inaccuracy of the synthesizers in the transmitter and receiver and to drift due to temperature or other reasons. The offset can be compensated for at the receiver, but present methods only produce a coarse estimate of the actual offset. According to one method for compensating for the offset, the analog signal received by a receiver is divided into three sections: short symbol section, long symbol section and data symbol section. Some of the short symbols in the short symbol section are used for automatic gain control and for detecting symbol timing. Other short symbols are sampled and digitized and auto-correlated to produce a coarse estimate of the offset. The coarse estimate of the offset is then used to produce a digital periodic signal whose frequency is based on the coarse estimate of the offset.

The digital periodic signal is multiplied with digital samples of the long symbols, when they arrive, and the product is fast Fourier transformed to produce a frequency domain representation of the long symbols as modified by the channel between the transmitter and the receiver (frequency domain representation of received long symbols). The long symbols are a predetermined sequence that is set by the standard to have a predetermined length and information content with a predetermined phase and amplitude. Since the longs are a predetermined sequence, the receiver is designed to store a Fourier transform of the long symbols substantially equivalent to the Fourier transform of the long symbols as transmitted by the transmitter (frequency domain representation of the transmitted long symbols). The quotient of the frequency domain representation of the received long symbols and the frequency domain representation of the transmitted long symbols is the channel estimate or channel transfer function. The channel estimate shows how the channel affects the amplitude and phase of the samples of the long symbols. The inverse of the channel estimate gives an indication of how the samples of a received data signal need to be adjusted in order to compensate for the effect of the channel.

The digital periodic signal is also used to multiply digital samples of the data symbols (digital data samples) when they arrive, thereby correcting for the offset. The data can be recovered from the product of the digital carrier and the digital data samples using the inverse of the channel estimate.

Unfortunately, the inverse of the channel estimate may become invalid with the passage of time due to magnitude changes, frequency offset error, timing drift, and phase noise, and, as such, may be inappropriate to use for decoding data symbols. For example, the pilots of the long symbols on which the inverse channel estimate is based may have an average power magnitude that is different from the average power magnitude of the pilots of a data symbol. Since the 802.11a standard allows transmission using quadrature amplitude modulation, proper decoding of data symbols depends on accurate determination of the amplitude of the subcarriers in a data symbol. Using an inverse channel estimate to decode a data symbol that has pilots whose average power magnitude is different from the average power magnitude of the pilots of the long symbol on which the inverse channel estimate is based may result in improper decoding of the data symbol.

Furthermore, since the short symbols from which the frequency offset was derived are relatively short, the estimate of the offset may be off appreciably from the actual offset. Consequently, there will be a residual offset that may cause the spectrum of one subcarrier to overlap with the spectrum of another subcarrier. Due to the overlap, when data is recovered for one subcarrier, the data may include interference from an adjacent subcarrier, degrading the throughput of the communication system. Furthermore, since there is a residual offset, the channel estimate that was produced using the long symbols is not an accurate representation of the actual transfer function due to the channel. Due to the inaccuracy, errors in data recovery are possible.

Another source of error is timing drift, which causes a data symbol to be sampled earlier or later than specified. Early sampling of a data symbol such that samples of the guard symbol are included in creating a frequency domain representation of the data symbol causes the phases of the subcarriers of the data symbol to rotate by an amount that is proportional to the number of guard samples that sampling is early. If the number of guard samples that sampling is early is known and does not change over time, the effect of the phase rotation can be compensated for. Unfortunately, the number of guard samples that sampling is early drifts over time and needs to be determined in order to compensate for the phase rotation. Another problem with timing drift is intersymbol interference. Sampling for a certain symbol may start early or late causing samples from a previous symbol or a later symbol, respectively, to be used in decoding the certain symbol. This problem is especially evident in multipath environments where much of the guard interval has already been consumed.

Another source of error is phase noise, which affects all subcarrier phases by an equal amount, assuming that the frequency of the phase noise is much less than the symbol frequency. Since the effect of phase noise on the channel estimate is different from the effect on a data symbol, using the channel estimate to decode a data symbol may be inappropriate.

U.S. application Ser. No. 10/076,022, filed Feb. 14, 2002, entitled "An Efficient Pilot Tracking Method For OFDM Receivers," describes methods and systems that provide a channel estimate that compensates for the factors of frequency offset, timing drift, and phase noise.

It is also desirable to provide alternative techniques to improve the accuracy of inputs to the calculation of such a channel estimate. For example, it would be desirable to provide alternative techniques for correcting for the phase ambiguity when tracking the total change of phase of a signal at a pilot carrier frequency relative to an initial phase value of an initial signal at the pilot carrier frequency associated with one or more training signals.

Consequently, it is desirable to provide a solution that overcomes the shortcomings of existing solutions.

SUMMARY

The presently preferred embodiments described herein according to aspects of the present invention implement techniques such as non-linear filtering and crossover detection algorithms in the tracking of pilot signals in order to, for example, maintain an accurate channel estimate in the presence of errors due to, for example, magnitude changes in the received signal, frequency offset between receiver and transmitter, timing drift, and phase noise.

More particularly, systems and methods for correcting phase ambiguity in a total pilot phase value are presented according to aspects of the present invention. Examples include comparing and correcting total pilot phase values having different pilot frequencies within the same sampling interval, such as the same data symbol. Another example includes correcting a total pilot phase value for one sampling interval and corresponding to one pilot frequency using nonlinear filtering of values of the total pilot phase for prior sampling intervals at the same pilot frequency.

In a communication system in which a communication signal is sent from a transmitter to a receiver, a method of correcting a phase value for a received modulated carrier at a pilot frequency is presented according to one aspect of the present invention. The communication signal is defined into a series of successive sampling intervals at the receiver. Each sampling interval has several modulated carriers at several corresponding frequencies. According to the method, for each modulated carrier received at a pilot frequency, a corresponding phase value is updated. The phase value is related to an initial training modulated carrier received at the pilot frequency. A non-linear filter function is applied to one or more prior phase values corresponding to one or more respective prior modulated carriers received at the pilot frequency to generate a filtered result value. The phase value is corrected if a difference of the phase value and the filtered result value exceeds a threshold value in absolute magnitude.

In a communication system in which a communication signal is sent from a transmitter to a receiver, a method of correcting, for a given sampling interval, one or more phase values of N phase values is presented according to another aspect of the present invention. The communication signal is defined into a series of successive sampling intervals at the receiver. Each sampling interval has several modulated carriers at several corresponding frequencies, including N modulated carriers at N corresponding pilot frequencies. The N phase values correspond to the N modulated carriers. According to the method, an expected order of the N phase values is established. The expected order is based on the N pilot frequencies. For each sampling interval, an actual order of the N phase values is examined. If the actual order does not correspond to the expected order, one or more of the N phase values are adjusted until the actual order corresponds to the expected order.

In a communication system in which a communication signal is sent from a transmitter to a receiver, a method of performing, for a given sampling interval, crossover detection and correction of one or more of N phase values is presented according to a further aspect of the present invention. The communication signal is defined into a series of successive sampling intervals at the receiver. Each sampling interval has several modulated carriers at several corresponding frequencies, including N modulated carriers at N corresponding pilot frequencies. The N phase values correspond to the N modulated carriers. According to the method, N phase values are calculated for each sampling interval. Whether the N phase values are in a predetermined order is determined. If the N phase values are not in the predetermined order, the N phase values are reordered until the N phase values are in the predetermined order by performing one or more of: adding a phase correction value to one or more of the N phase values, and subtracting the phase correction value from one or more of the N phase values.

A method for maintaining an accurate channel estimate is presented according to another aspect of the present invention. A reference channel estimate is provided based on at least one first symbol. A frequency domain representation of a second symbol including a plurality of pilots is generated. Phase change in the plurality of pilots of the second symbol relative to pilots of the at least one first symbol is tracked to produce correction factors. Tracking the phase change includes using a nonlinear filter to correct for phase ambiguity in a phase value. The reference channel estimate is adjusted based upon the correction factors.

A method for maintaining an accurate channel estimate is presented according to a further aspect of the present invention. A frequency domain representation of at least one training symbol is generated. A number of clock cycles that the at least one training symbol is sampled early is determined. First correction factors are generated based on the number of clock cycles. The frequency domain representation is adjusted based upon the first correction factors to produce a reference channel estimate. A frequency domain representation of a first data symbol is generated. Phase change in pilots of the first data symbol relative to pilots of the at least one training symbol is tracked to produce second correction factors. Tracking phase change includes calculating N phase values at N corresponding pilot frequencies at the first data symbol and adjusting the N phase values to ensure that the N phase values are ordered according to an expected order. The expected order is based on the N corresponding pilot frequencies. The reference channel estimate is adjusted based upon the second correction factors.

An apparatus for maintaining an accurate channel estimate is presented according to another aspect of the present invention. The apparatus includes a frequency domain transform unit, an early sampling detection circuit, an angle-to-vector converter, a first multiplier, a pilot phase tracking circuit, and a second multiplier. The frequency domain transform unit generates a frequency domain representation of at least one training symbol and a frequency domain representation of a first data symbol. The early sampling detection circuit determines, based on the frequency domain representation of the at least one training symbol, a number of clock cycles that the at least one training symbol is sampled early. The angle-to-vector converter produces several first correction factors based on the number of clock cycles. The first multiplier adjusts the frequency domain representation based upon the first correction factors to produce a reference channel estimate. The pilot phase tracking circuit determines for each pilot in the first data symbol an associated total amount of rotation relative to a corresponding pilot in the at least one training symbol and adjusts the associated total amount of rotation for each pilot to ensure that the associated total amounts are ordered according to an expected order, in order to produce several second correction factors. The expected order is based on the pilots. The second multiplier adjusts the reference channel estimate based upon the several second correction factors.

An apparatus for maintaining an accurate channel estimate is presented according to a further aspect of the present invention. The apparatus includes a memory, a pilot phase tracking circuit, and a multiplier. The memory stores the reference channel estimate. The pilot phase tracking circuit receives pilots of at least one training symbol and pilots of a first data symbol. The pilot phase tracking unit determines for several pilots in the first data symbol an associated total amount of rotation relative to a corresponding pilot in the at least one training symbol. The pilot phase tracking unit determines a least squares fit based on the associated total amount of rotation for each pilot of the several pilots in the first data symbol. The pilot phase tracking unit produces several first correction factors based on the least squares fit. The pilot phase tracking unit includes, for each pilot of the several pilots, a corresponding non-linear filter to provide the corresponding associated total amount of rotation without phase ambiguity. The multiplier adjusts the reference channel estimate based upon the several first correction factors.

An apparatus for maintaining an accurate channel estimate is presented according to another aspect of the present invention. The apparatus includes a memory, a pilot phase tracking circuit, and a multiplier. The memory stores the reference channel estimate. The pilot phase tracking circuit receives pilots of at least one training symbol and pilots of a first data symbol. The pilot phase tracking unit determines for several pilots in the first data symbol an associated total amount of rotation relative to a corresponding pilot in the at least one training symbol. The pilot phase tracking unit determines a least squares fit based on the associated total amount of rotation for each pilot of the several pilots in the first data symbol. The pilot phase tracking unit produces several first correction factors based on the least squares fit. The pilot phase tracking unit adjusts and reorders initial values of the associated total amount of rotation for the several pilots to provide the corresponding associated total amount of rotation in accordance with an expected order based on the several pilots. The multiplier adjusts the reference channel estimate based upon the several first correction factors.

BRIEF DESCRIPTION OF THE DRAWINGS

The foregoing and other features, aspects, and advantages will become more apparent from the following detailed description when read in conjunction with the following drawings, wherein.

DETAILED DESCRIPTION OF THE PRESENTLY PREFERRED EMBODIMENTS

The present invention will now be described in detail with reference to the accompanying drawings, which are provided as illustrative examples of preferred embodiments of the present invention.

Methods and systems for implementing techniques such as non-linear filtering and crossover detection algorithms in the tracking of pilot signals in order to, for example, maintain an accurate channel estimate in the presence of errors due to, for example, magnitude changes in the received signal, frequency offset between receiver and transmitter, timing drift, and phase noise are described. In the following description, for purposes of explanation, numerous specific details are set forth in order to provide a thorough understanding of the present invention. It will be evident, however, to one skilled in the art that the present invention may be practiced in a variety of radio frequency circuits, especially an orthogonal frequency division multiplexing circuit, without these specific details. In other instances, well-known operations, steps, functions and elements are not shown in order to avoid obscuring the invention.

Parts of the description will be presented using terminology commonly employed by those skilled in the art to convey the substance of their work to others skilled in the art, such as orthogonal frequency division multiplexing, fast Fourier transform (FFT), angle-vector and vector-angle conversions, pilots, subcarrier, and so forth. Various operations will be described as multiple discrete steps performed in turn in a manner that is most helpful in understanding the present invention. However, the order of description should not be construed as to imply that these operations are necessarily performed in the order that they are presented, or even order dependent. Lastly, repeated usage of the phrases "in one embodiment," "an alternative embodiment," or an "alternate embodiment" does not necessarily refer to the same embodiment, although it may.

Figure 1A:
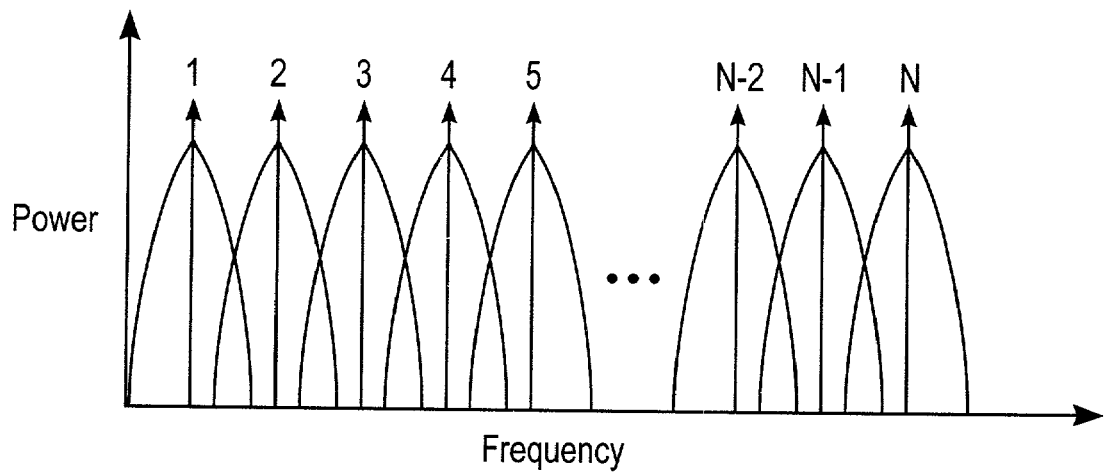
FIG. 1a illustrates the frequency spectrum of multiple modulated subcarriers in an OFDM system.
Figure 1B:
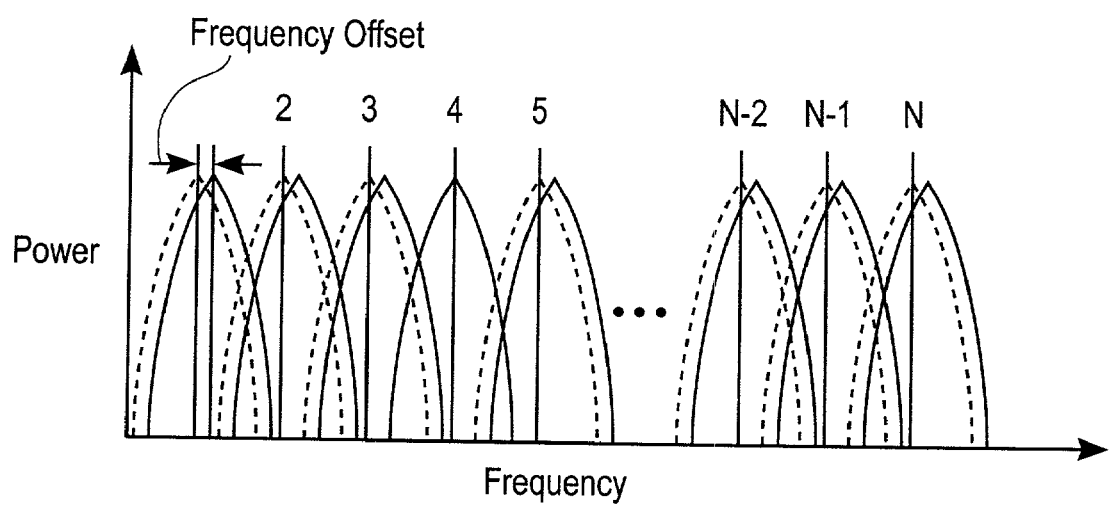
FIG. 1b illustrates the effect of the lack of synchronization on the frequency spectrum of multiple subcarriers.
Figure 2:
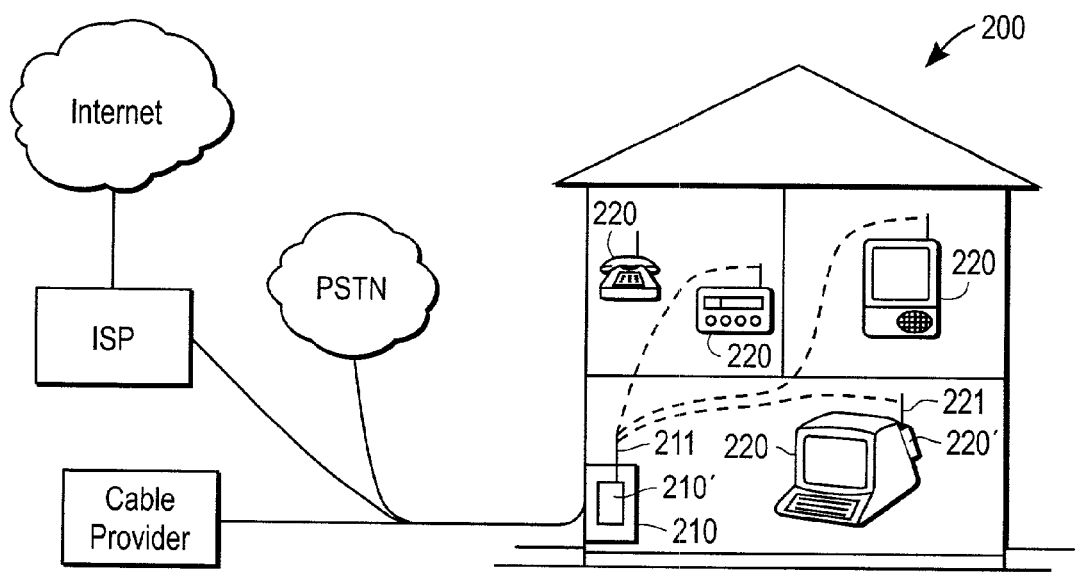
FIG. 2 illustrates a communication system according to one embodiment of the present invention.

FIG. 2 illustrates a communication system according to one embodiment of the present invention. System 200 includes a gateway 210 which is connected via a cable (or multiple cables) to the public switched telephone network (PSTN), a cable television system, an Internet service provider (ISP), or some other system. Gateway 210 includes a transceiver 210' and antenna 211. Appliance 220 includes a transceiver 220' and antenna 221. Appliance 220 could be a television, computer, telephone, or some other appliance. Transceiver 210' provides transceiver 220' with a wireless connection to the systems which are connected to gateway 210. According to one embodiment, transceivers 210' and 220' communicate in accordance with the IEEE 802.11a standard. Consequently, each of transceivers 210' and 220' includes a receiver and a transmitter that communicate information formatted according to the 802.11a standard. In alternative embodiments, as indicated below, transceivers

210' and 220' may have design features that deviate from the IEEE 802.11a standard. For example, the present invention can be practiced in a system that has a packet structure that is different from the 802.11a standard; e.g., different number of symbols having a known amplitude and phase, different organization and number of guard intervals, data symbols, long symbols. Furthermore, the present invention can be practiced with sampling rates specified by the standard or other rates, different pilot organization, and a different number of carriers, among other differences.

Figure 3:
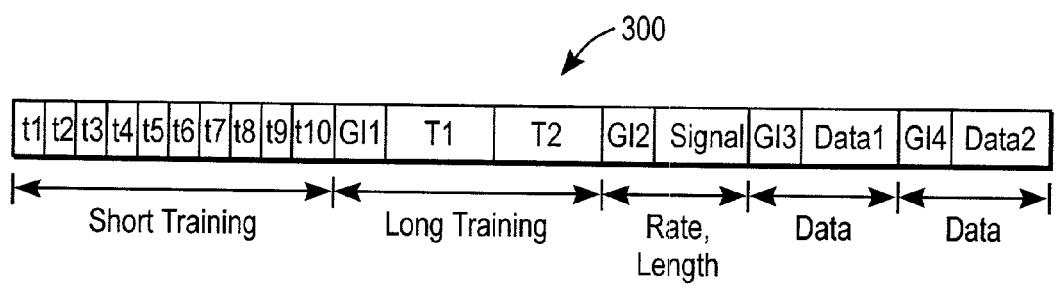
FIG. 3 illustrates the packet structure that the IEEE 802.11a standard requires for information transmission between two transceivers.

FIG. 3 illustrates the packet structure that the IEEE 802.11a standard requires for information transmission between two transceivers. A receiver in transceiver 210' or 220' is designed to accept a packet such as packet 300 and to derive timing information, data, and other information from the packet. For example, in packet 300, the first 10 symbols (t1 to t10), which are referred to as the shorts, are repeated random sequences that a receiver uses for detecting symbol timing and coarse carrier frequency offset. GI1 is the cyclic prefix of the two long symbols T1 and T2, and is sometimes referred to as a guard interval because of its use as a rough inter-symbol boundary for absorbing the effect of multipath. GI1 is made long enough such that if short symbol t10 undergoes multipath, symbol t10 will partially "smear" into GI1 without affecting T1. T1 and T2, referred to as the longs, are used for channel estimation, fine frequency offset estimation, and fine symbol timing adjustment. Having a relatively accurate channel estimate is essential to proper decoding of data symbols. There are several factors that can affect channel estimation validity: changes between the long symbols, on which the channel estimate is based, and the data symbols, frequency offset between the receiver and transmitter, timing drift, and phase noise. The present invention provides for a channel estimate based on the long symbols to be adjusted based on successive estimates of pilot signals in a data symbol. The successive estimates allow the original channel estimate to be made updated despite the effects of magnitude change, phase noise, timing drift, and frequency offset.

According to one embodiment, each short symbol takes 0.8 μs, allowing altogether 8 μs to perform signal detection, automatic gain control (AGC) and coarse symbol timing and frequency offset estimation. According to one embodiment, GI1 takes 1.6 μs, twice the amount of the usual cyclic prefix between data symbols, to absorb the computation latency necessary in performing the above functions. After the shorts, GI1 provides a rough inter-symbol boundary which allows the two longs, T1 and T2, to be captured without multipath effects, as the relatively long GI1 is sized to provide an ample buffer zone to absorb any error in symbol boundary. According to one embodiment, T1 and T2 each take up 3.2 μs, and are used to derive two estimates of the channel characteristics, as the data bits transmitted in T1 and T2 are known at the receiver. The two channel estimations are combined and manipulated to form a reference channel estimate for the following data symbols. After the longs, the packet enters into data symbols. Each data symbol is 3.2 μs long and preceded by a cyclic-prefix of 0.8 μs. The cyclic prefix is used to absorb delay spread caused by multipath so that the OFDM symbols can remain orthogonal. The first symbol is a SIGNAL symbol, which is, according to one embodiment, transmitted in binary phase shift keying (BPSK) with a ½-rate code. The SIGNAL symbol is transmitted in BPSK because all systems will be able to communicate in the BPSK ½ rate code, but all may not be able to communicate in quadrature amplitude modulation. The SIGNAL symbol needs to be detected correctly, as it contains the information needed for decoding the rest of the packet, hence the use of BPSK with the ½-rate code. The data symbols can be transmitted in BPSK, quaternary phase shift keying (QPSK), 16-quadrature amplitude modulation (QAM), or 64-QAM with various degrees of error correction, to provide a scaleable set of data rates in response to different channel conditions.

Figure 4A:
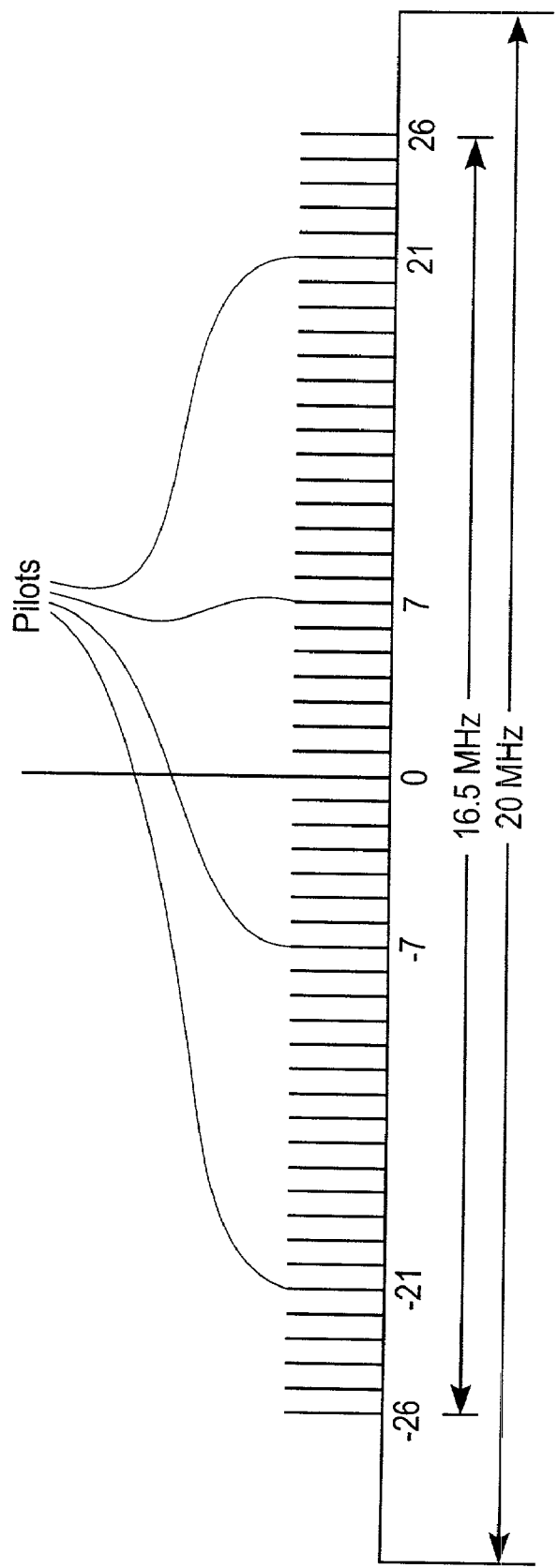
FIG. 4a illustrates subcarriers and pilots of an OFDM signal in accordance with the 802.11a standard.

FIG. 4a illustrates subcarriers and pilots of an OFDM signal in accordance with the 802.11a standard. According to the 802.11a standard an OFDM signal has 52 subcarriers. The 52 subcarriers are numbered from −26 to +26 and occupy 16.5625 MHz of the 20 MHz bandwidth allocated to one 802.11a channel. The 0 subcarrier is ignored because direct current at the receiver prevents reliable transmission of information on that subcarrier. For an OFDM long symbol signal, all the 52 subcarriers have a known amplitude and phase which allows a channel estimate to be determined for communication between a transmitter and receiver. In a long symbol, four of the 52 subcarriers are referred to as pilot signals even though all the subcarriers behave like pilot signals because their amplitude and phase are also known. The +/−21 and the +/−7 subcarriers are pilot signals. In contrast, for an OFDM data symbol, 48 of the 52 subcarriers are non-deterministic data carriers, while the remaining 4 carriers are pilot signals whose amplitude and phase are known.

According to one embodiment, a channel estimate is derived from the long symbols by taking a Fourier transform of samples of the long symbols. The Fourier transform of the long symbol samples is the frequency domain representation of the long symbols as received at the receiver after modification by the channel between the receiver and transmitter. Since the long symbols have a known amplitude and phase, the frequency domain representation of the long symbols as transmitted by the transmitter can be and is stored at the receiver. According to one embodiment, the channel estimate is derived by simply taking the quotient of the frequency domain representation of the long symbols as received at the receiver and the frequency domain representation of the long symbols as transmitted by the transmitter.

By inverting the channel estimate, the phase and magnitude correction factor for each subcarrier can be determined. The correction factors of the inverted channel estimate are used to correct the frequency domain representation of each data symbol that is received at the receiver. The frequency domain representation of each data symbol is a sequence of complex values, where each complex value is representative of the phase and amplitude of a data symbol subcarrier as received at the receiver. For each data symbol subcarrier the correction factor is a complex value which is used to make an adjustment to the phase and amplitude of the data symbol subcarrier.

With time, due to phase noise, timing offset, and frequency offset, the correction factors become inaccurate and prevent accurate decoding of a received data symbol. The present invention provides mechanisms for adjusting the inverted channel estimate, both magnitude and phase, so that the data symbols can be accurately decoded.

The mechanisms according to aspects of the present invention involve monitoring the total change in phase of each pilot in a data symbol and monitoring the intersymbol change in the average power of the pilots. By monitoring how the total change in phase of each pilot in a data symbol changes over time in comparison to the corresponding pilot of the long symbols, the effects of phase noise, timing drift, and frequency offset between the receiver and transmitter can be accounted for and the inverse channel estimate adjusted. Additionally, by monitoring the change in the average power of the pilots of a data symbol in comparison to the average power of the pilots of the long symbols, the effect of changes in magnitude can be accounted for and the inverse channel estimate adjusted.

Figure 4B:
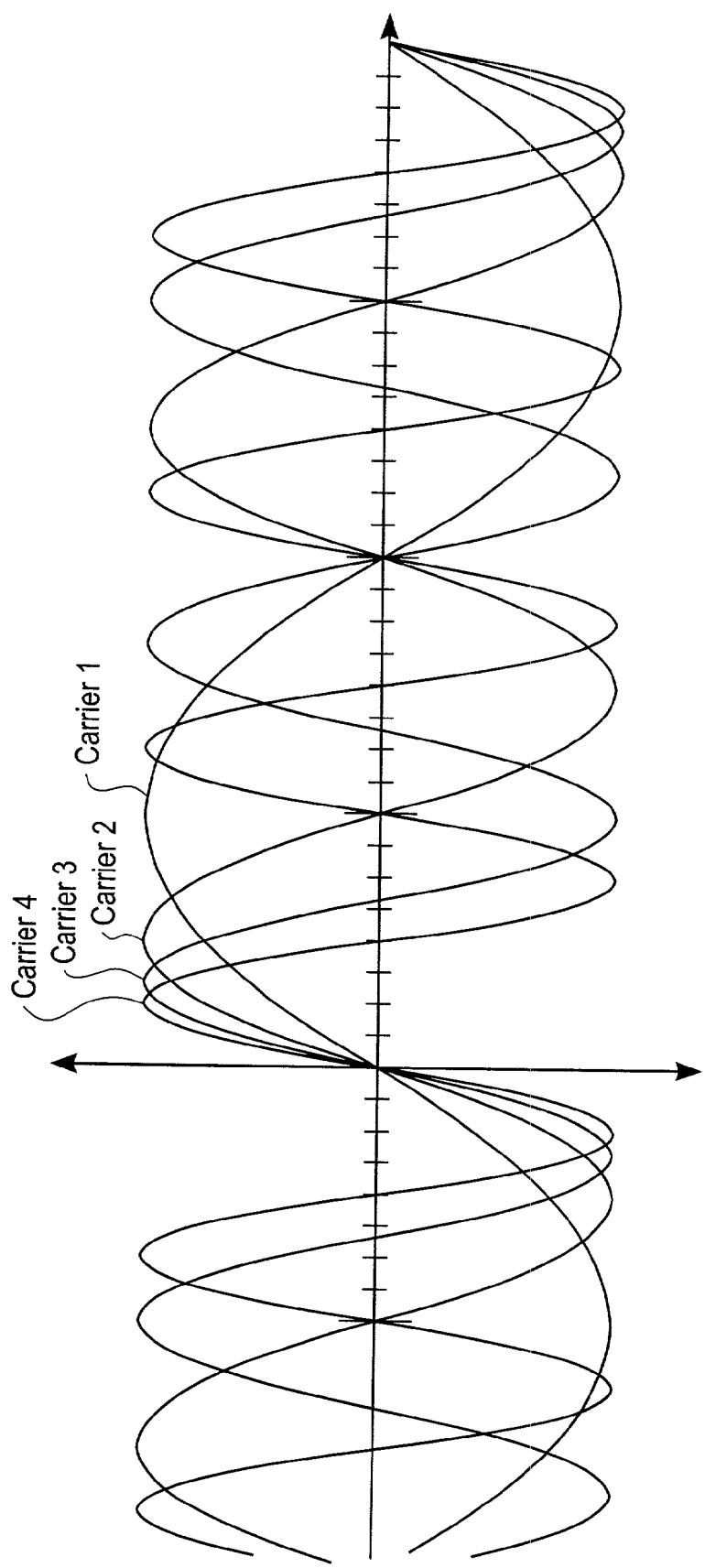
FIG. 4b illustrates several discrete waveforms that together form a part of an OFDM signal in accordance with the 802.11a standard.

FIG. 4b illustrates several discrete waveforms that together form a part of an OFDM signal in accordance with the 802.11a standard. While all the waveforms are shown to be of equal amplitude and phase, it should be appreciated that other waveforms with unequal amplitudes and phases are possible and are encompassed by the present invention. Assume for the purposes of the discussion that the waveforms are representative of the waveforms of a long symbol. If the long symbol is sampled early, the phase of each waveform will be proportional to the product of the frequency of the waveform and the number of samples (i.e., clock cycles) that the sampling of the waveforms is early. There is a linear relationship between the angle of a subcarrier and the timing offset measured in the number of clock cycles by which the sampling is early. Assuming a 40 MHz sampling rate, for every 128 clock cycles subcarrier 1 completes one cycle. Consequently, for every clock cycle that subcarrier 1 is sampled early the phase of the subcarrier is rotated by $-\pi/64$. So, for example, if the symbol timing were early by one clock cycle, subcarrier 3 is expected to rotate by $-\pi/64$ radians, and subcarrier $-3$ is expected to rotate by $3\pi/64$ radians. The amount of rotation in radians, generally, is given by equation 1.0 below.

$$\text{Rotation}=-(\text{Numclocks\_early})(\text{Subcarrier\_number})\pi/64 \quad \text{Equation 1.0}$$

Numclocks_early is the number of clock cycles by which the symbol timing is off. Subcarrier_number is the number of the subcarrier for which rotation is to be determined. As indicated above, Subcarrier_number varies from $-26$ to $+26$.

Figure 4C:
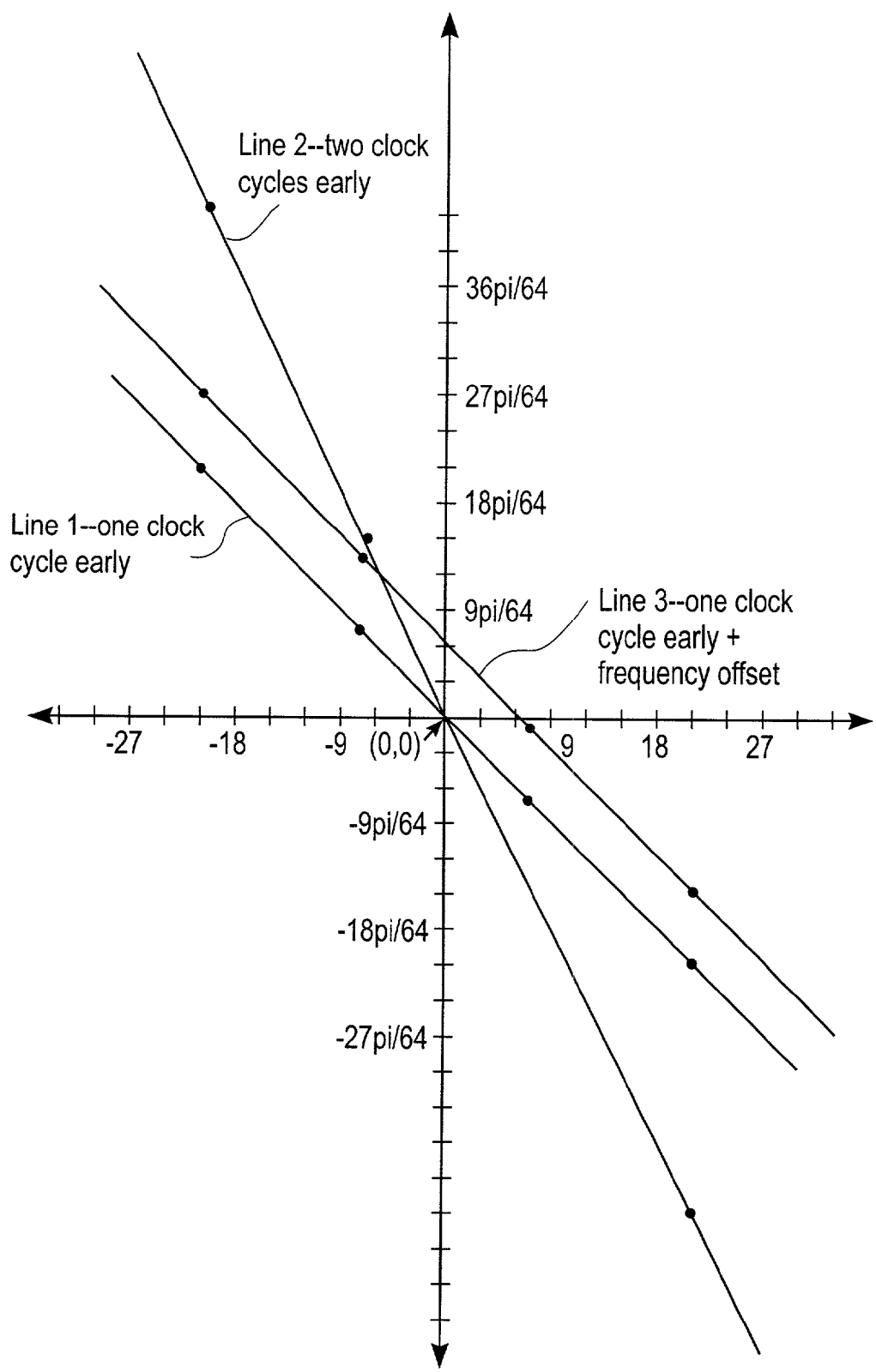
FIG. 4c illustrates a graph of the total change in phase of pilots versus subcarrier number for early sampling by various clock cycles.

FIG. 4c illustrates a graph of the total change in phase of pilots versus subcarrier number for early sampling by various clock cycles. Line 1 is the line through the points associated with each pilot where sampling is one clock cycle early. Line 2 is the line through the points associated with each pilot where sampling is two clock cycles early. Line 3 is the line through the points associated with each pilot where sampling is one clock cycle early and there is a frequency offset between receiver and transmitter. As shown in FIG. 4b, the waveforms are not influenced by a frequency offset between the receiver and transmitter. Had there been a frequency offset, the waveforms of FIG. 4b would have been either compressed or expanded. Assuming that there is a frequency offset, it would affect the phase of all the subcarriers equally. In terms of the pilots of FIG. 4c, the phases of each of the pilots would increase by the same amount which translates in a simple shift up or down along the phase axis. Consequently, line 3 is simply a shifted version of line 1.

Figure 4D:
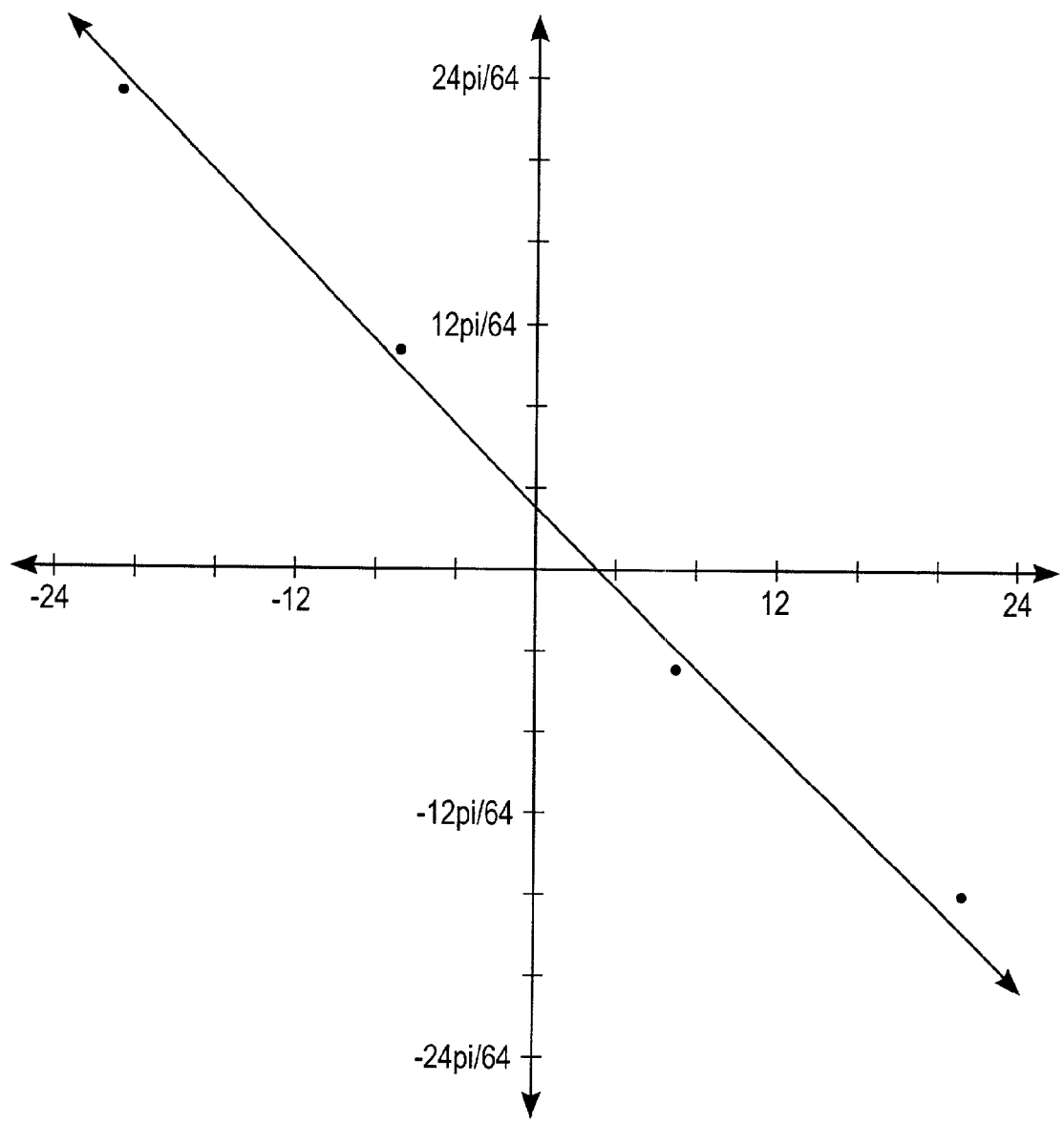
FIG. 4d illustrates a graph of the total change in phase of each pilot of a data symbol, relative to the corresponding pilot in the long symbols, versus subcarrier number in the presence of phase noise, timing drift, and frequency offset.

FIG. 4d is an illustrative graph of a possible change in phase of each pilot of a data symbol, relative to the corresponding pilot in the long symbols, versus subcarrier number in the presence of phase noise, timing drift, and frequency offset. The effect of phase noise, timing offset, and frequency offset, can be compensated for by first determining the slope and phase intercept of a line that will produce a least squares fit between the line and the actual phase plots (the four dark points on the graph). The change in phase of the subcarrier in a data symbol relative to the corresponding subcarrier in the long symbols can be determined using a simple equation such as $tdp_i=(\text{slope})i+\text{phase intercept}$, where $tdp_i$ is the total rotation of the $i^{th}$ subcarrier relative to the $i^{th}$ subcarrier of the long symbols and i is between $-26$ and $+26$ inclusive. A unit vector with an angle equal to $-tdp_i$ is the phase correction factor that needs to be multiplied with the $i^{th}$ subcarrier in the inverse channel estimate in order to adjust the $i^{th}$ subcarrier for phase noise, frequency offset and timing offset. For example, in FIG. 4d, the slope of the least squares fit line through the pilots indicates a timing offset of one clock cycle. Moreover, the line indicates that there is frequency offset because it does not pass through point (0,0) on the graph. The intercept of the line and the phase axis divided by the time elapsed since the channel estimate was made gives an indication of the frequency offset estimation error. The inverse channel estimate can be adjusted to account for phase noise, timing offset, and frequency offset by rotating each subcarrier in the inverted channel estimate by the negation of the total rotation of the corresponding subcarrier that is derived from the least squares fit line.

Figure 5:
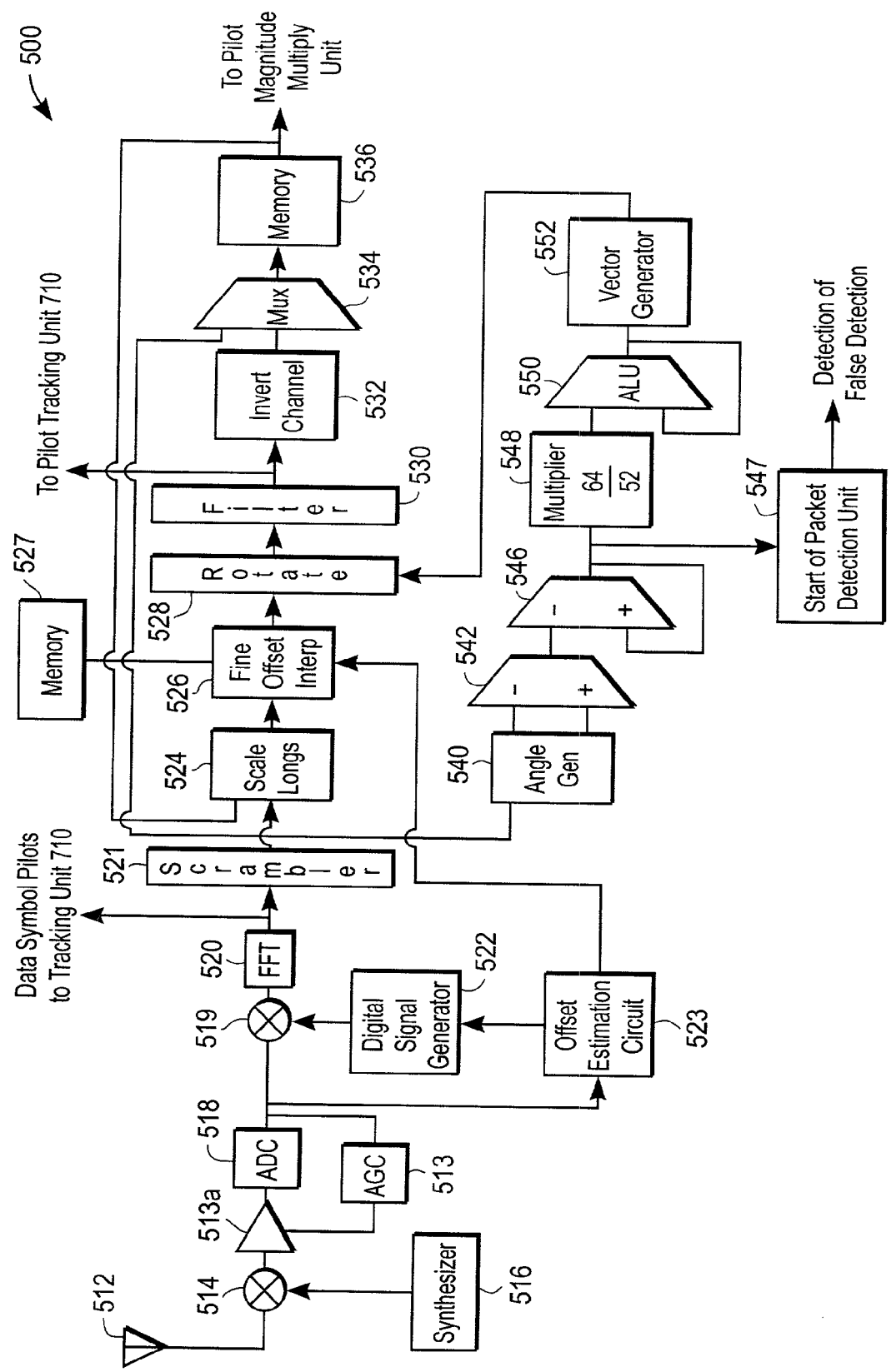
FIG. 5 illustrates a receiver in accordance with an embodiment of the present invention.

FIG. 5 illustrates a receiver in accordance with an embodiment of the present invention. Receiver 500 includes an automatic gain control (AGC) circuit 513, a variable gain amplifier (VGA) 513a, antenna 512, an analog mixer 514, a synthesizer 516, and an analog-to-digital converter (ADC) 518. Antenna 512 receives a packet such as packet 300 described above in the form of an analog signal transmitted by a transceiver such as transceiver 210' or 220' described above. Depending on the frequency with which transceiver 210' and 220' are communicating, synthesizer 516 produces a synthesizer signal with a frequency such that when the signal received at antenna 512 is multiplied with the synthesizer signal by mixer 514, a baseband version of the analog signal is produced by mixer 514. Since the baseband analog signal is likely to be weak, VGA 513a amplifies the baseband analog signal to produce an amplified baseband analog signal.

The ADC 518 samples and digitizes the amplified baseband analog signal to produce digital samples of the amplified baseband analog signal. Since the amplified baseband analog signal is likely to have a varying amplitude due to changes in the strength of the received signal at antenna 512, the amplitude of the digital samples are likely to vary as well. For proper operation of the subsequent stages of the receiver, it is preferable that the amplified baseband analog signal have a relatively constant amplitude before digital samples are taken. A relatively constant amplitude is achieved by AGC 513 processing the digital samples produced at the output of ADC 518 to produce a correction signal to VGA 513a to adjust the degree of amplification. Typically, the first 5 or 6 short symbols that are received are used to settle AGC 513 and are not used to produce a coarse offset estimate of the offset between the synthesizers in the transmitter and the receiver. Depending on the design of the communication system, a certain number of the 10 shorts are not needed to settle AGC 513. The shorts that are not needed for automatic gain control can be used for coarse offset estimate and for coarse symbol timing. When the analog signal received is the shorts that are not needed for automatic gain control, mixer 514 produces at its output a replica of the shorts but at baseband, and VGA 513a produces an amplified replica of the baseband short symbols. According to one embodiment, ADC 518 takes 16 samples of each amplified baseband short symbol which translates into a rate of 20 million samples/second. In an alternative embodiment, ADC 518 takes 32 samples of each short symbol which translates into a rate of 40 million samples/second. Digital mixer 519 multiplies the digital samples of the shorts with the output of digital signal generator 522. Since there can be no indication of the offset until a packet is received and analyzed, signal generator 522 initially has as an output a unit vector which has zero frequency.

Generator 522 receives from offset estimation circuit 523 estimates of the frequency offset between the receiver and transmitter. Generator 522 produces periodic signals with frequencies based on the frequency offset between the receiver and transmitter. Offset estimation circuit 523 produces a coarse offset estimate and a fine offset estimate based on the short symbol samples and long symbol samples, respectively, produced by ADC 518. When a coarse offset estimate using the short symbols is determined by offset estimation circuit 523, signal generator 522 produces a periodic digital signal with a frequency based on the coarse offset estimate for application to multiplier 519. Multiplier 519 multiplies the long symbols that follow the short symbols with the periodic signal based on the coarse offset estimate to compensate for the mismatch between the transmitter and receiver. When a fine offset estimate using the long symbols is determined by circuit 523, signal generator 522 produces a periodic digital signal with a frequency based on the fine offset estimate. Multiplier 519 multiplies the data symbols that follow the long symbols with the periodic signal based on the fine offset estimate. The operation of generator 522 and offset estimation circuit 523 is described in greater detail in "Method And Circuit Providing Fine Frequency Offset Estimation and Calculation" with U.S. Ser. No. 09/963,115 and a filing date of Sep. 24, 2001.

When the first long symbol arrives, mixer 519 multiplies samples of the long symbol produced by ADC 518 with the periodic signal with frequency based on the coarse offset estimate. The product of mixer 519 is applied to fast Fourier transform (FFT) unit 520. FFT unit 520 produces a frequency domain representation of the first long symbol. The frequency domain representation of the first long symbol is applied to scrambler 521. Scrambler 521 multiplies every bin of the frequency domain representation of the first long symbol (and the second long symbol when it is produced by FFT unit 520) by either +/−1 as specified in Section 17.3.3 of 802.11a D7.0 (1999), Draft Supplement to Standard for Lan/Man Part II: MAC and Phy specification. Scrambler 521 multiplies the pilots of the data symbols by +/−1 as specified by section 7.3.5.9 of 802.11a D7.0 (1999). The output of scrambler 521 is applied to an input of multiplexer 534. Multiplexer 534 outputs the frequency domain representation of the first long symbol to memory 536 for storage.

The output of scrambler 521 is also applied to angle generator 540. Angle generator 540 takes a complex value and produces an angle for each sample of the scrambled frequency domain representation of the first long symbol. According to one embodiment, generator 540 implements the cordic algorithm for doing the vector to angle conversion. The angle of each sample of the scrambled frequency domain representation of the first long symbol is applied to angle difference generator 542. According to one embodiment the frequency domain representation of the first long symbol has 128 samples. The number of samples is a design consideration and values other than 128 are possible, (e.g., 64 samples) For purposes of illustration only, the samples are numbered from −64 to +63. The samples from −26 to +26 are representative of the frequency domain representations of the signals in the 52 subcarriers. Samples −37 to −27 and 27 to 37 are representative of the frequency domain representation of the guard bands between a 802.11a channel and its adjacent channels on either side.

Beginning with sample −26 and ending with sample 26, difference generator 542 produces the difference in angle between two consecutive samples of the frequency domain representation of the first long symbol. Sample 0 is ignored because its phase is not correlated with the subcarrier phase of other samples. Consequently, difference generator 542 produces the phase difference between subcarriers −1 and +1. The differences in angles produced by difference generator 542 are applied to accumulator 546. Accumulator 546 adds up the differences in angles produced by generator 542 for samples −26 through sample 26 to produce a sum of the differences in angles for these samples (AccumAngle in Equation 2.0 below). Equation 2.0, below, represents the calculation that is performed by accumulator 546 to produce the sum of the differences in angles for the samples of the subcarriers.

$$AccumAngle = \sum_{i=-26}^{25} \left( (phase(subcarrier_{i+1}) - phase(subcarrier_i) + \pi) \mod 2\pi \right) - \pi \qquad \text{Equation 2.0}$$

The $\pi) \mod 2\pi) - \pi$ arithmetic simply causes each incremental difference to be within $-\pi$ and $+\pi$ and i refers to the subcarrier number.

Boundary detection circuit 547 evaluates AccumAngle to determine whether a packet is being received and generates a false detection indication when AccumAngle has a value that indicates that a packet is not being received. AccumAngle should be within a certain range if in fact a long symbol is being processed. According to one embodiment, if AccumAngle is not between $-32\pi$ and $-long1\_thres* \pi$, where long1_thres can have values 0, 2, 4, or 8, circuit 547 generates a false detection indication, the processing of the received signal is discontinued and the receiver returns to waiting for a packet to be received. When AccumAngle is not between $-32\pi$ and $-long1\_thres*\pi$, a false detection of a packet has occurred.

AccumAngle is scaled by a factor of 64/52 by scaler 548 to reflect the sum of the differences that would have been calculated had there been 64 instead of 52 subcarriers. The sum of the differences produced by scaler 548 gives an indication of how many clock cycles the long symbol was sampled too early (i.e., the number of samples by which the original timing estimate for the start of the long symbol was off).

As indicated above, there is a linear relationship between the angle of a subcarrier and the timing offset measured in the number of clock cycles by which the sampling is early. For every 128 clock cycles subcarrier 1 completes one cycle. Consequently, for every clock cycle that subcarrier 1 is sampled early the phase of the subcarrier is rotated by $-\pi/64$. So, for example, if the symbol timing were delayed by one clock cycle, subcarrier 21 is expected to rotate by 21 $\pi/64$ radians, and subcarrier −21 is expected to rotate by $-21\pi/64$ radians.

When the second long symbol arrives and scrambler 521 produces a scrambled frequency domain representation of the second long symbol, scrambler 521 applies the scrambled frequency domain representation of the second long symbol to long symbol scaling circuit 524. Also scaling circuit 524 retrieves from memory 536 the frequency domain representation of the first symbol. According to one embodiment, scaling circuit 524 averages the channel estimate for each subcarrier in the frequency domain representations of the first long symbol and second long symbol. The process of averaging is represented by equation 3.0 below.

$$AvgSubcarrier_i = \frac{FirstLongSubcarrier_i + SecondLongSubcarrier_i}{2} \quad \text{Equation 3.0}$$

The averaging is performed for i=−26 to +26. After averaging the frequency domain representations of the first and second long symbols to produce an averaged frequency domain representation, the averaged frequency domain representation is provided to the fine offset circuit 526. In an alternative embodiment, the averaged frequency domain representation may be scaled as described below before being provided to circuit 526.

Fine offset circuit 526 adjusts the averaged frequency domain representation to remove the effect of the residual offset between the transmitter and the receiver on the frequency domain representations of the first and second long symbols. Circuit 526 receives from offset estimation circuit 523 a fine offset estimate that is indicative of any residual offset between the transmitter and receiver and that is derived from the long symbols. Since the frequency domain representation of the first and second long symbols was derived from signals that were adjusted using the coarse offset estimate, they may contain a residual offset whose effect on the long symbols needs to be removed. As indicated above, the operation of offset estimation circuit 523 and signal generator 522 are described in greater detail in "Method And Circuit Providing Fine Frequency Offset Estimation and Calculation" with U.S. Ser. No. 09/963,115 and a filing date of Sep. 24, 2000. The operation of circuit 526 will be described in greater detail below.

According to an alternative embodiment, scaling circuit 524 adds each subcarrier in the frequency domain representation of the first long symbol to its corresponding subcarrier in the frequency domain representation of the second long symbol to produce a sum of the frequency domain representations of the first symbol and the second symbol. The process of producing the sum of the frequency domain representations of the first symbol and the second symbol is described by equation 4.0 below.

$$SumofSubcarrier_i = FirstLongSubcarrier_i + SecondLongSubcarrier_i \quad \text{Equation 4.0}$$

The summation is performed for i=−26 to +26. After summation, the values of SumofSubcarrier may be adjusted to decrease the effect of quantization noise that may be injected into the process of producing a channel estimate from the long symbols by subsequent circuits that follow circuit 524. For example, if the values of SumofSubcarrier are in block floating point format they can be shifted such that they take up as much as possible the word length of the registers which perform the operations necessary to produce the channel estimate without causing overflow.

Figure 6A:
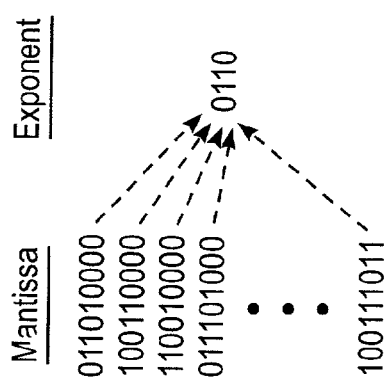
FIG. 6a illustrates numbers represented in block floating point format.
Figure 6A:
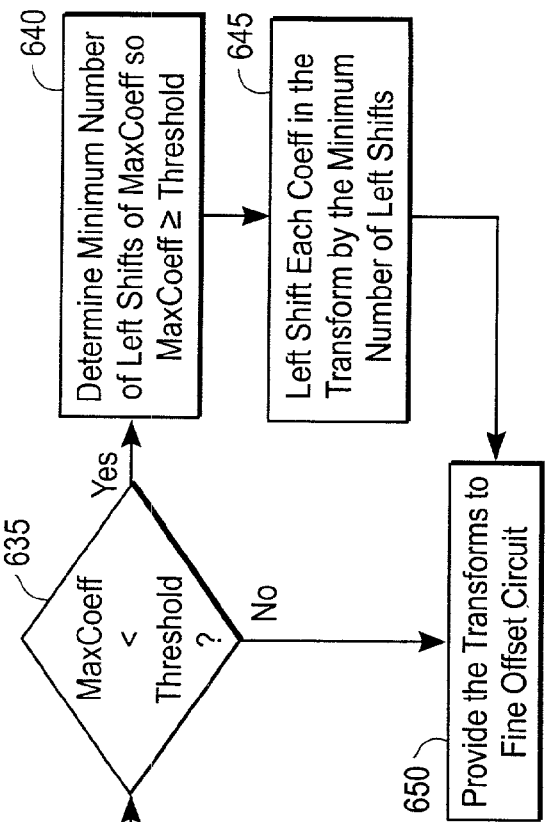

FIG. 6a illustrates numbers represented in block floating point format. In block floating point format a block of numbers (i.e., several mantissas) share one exponent. Assuming the output of unit 521 is due to receipt of the first long symbol and the second long symbol at the receiver, unit 524 puts out numbers which are the frequency domain representations of the long symbols and which are formatted in accordance with the block floating point format. The number of bits in the mantissa and exponent is a design consideration, and the present invention encompasses many different combinations. For purposes of illustration only, according to one embodiment, the mantissa is 16 bits long and the exponent is 5 bits long. According to one embodiment, adders and multipliers which perform operations on the 16-bit numbers use 17 bit registers for the mantissas and 5 bit registers for the exponents. Since, in performing computations, it is desirable for purposes of minimizing loss of information to use as much of the word length of the registers as possible without causing an overflow, if the numbers produced by unit 521 are relatively small it is beneficial to have them scaled so that they use as much of the word length as possible. The amount of scaling is dependent upon how much 'headroom' is needed in order to avoid overflow. For example, if mantissas are 16-bits long, numbers are scaled up to the $14^{th}$ bit, with two bits left for headroom.

Figure 6B:
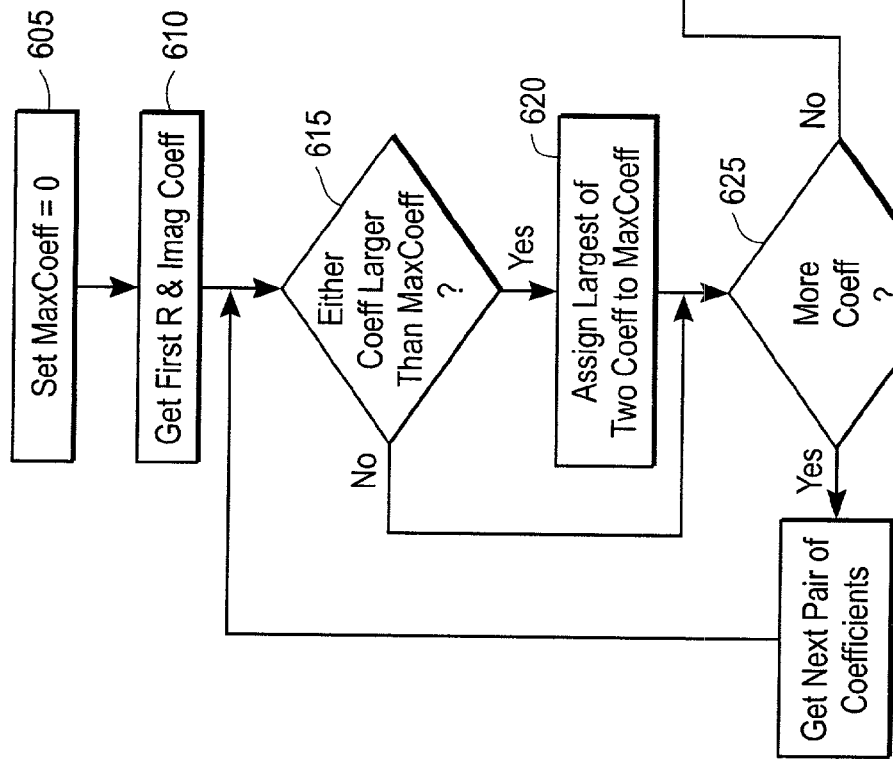
FIG. 6b illustrates a process by which a frequency domain representation is adjusted to minimize loss of information due to subsequent operations on the representation.

FIG. 6b illustrates a process for scaling a frequency domain representation of a signal to minimize loss of information. According to one embodiment, circuit 524 performs a process such as process 600. Circuit 524 sets 605 variable MaxCoeff to 0. Circuit 524 then retrieves 610 the coefficients of SumSubcarrier$_1$, and examines 615 the absolute value of the size of each of the coefficients to determine if either is greater than MaxCoeff. If either is larger than MaxCoeff, circuit 524 assigns 620 the largest of the two coefficients to MaxCoeff. Circuit 524 then determines 625 whether more coefficients need to be compared to MaxCoeff. If there are more coefficients to be compared, circuit 524 determines 615 whether either of the coefficients is greater than MaxCoeff. If there are no more coefficients to compare, circuit 524 determines 635 whether MaxCoeff is greater than a threshold that has been selected so that numbers can be properly represented by the registers during calculations involving the numbers. According to one embodiment, the threshold is the number which has the $14^{th}$ bit set, or 16,384. If MaxCoeff is less than the threshold, circuit 524 determines 640 the minimum numbers of left shifts of MaxCoeff that will make MaxCoeff greater than or equal to the threshold. After determining the minimum number of left shifts, circuit 524 left shifts 645 each coefficient for all SumSubcarrier$_j$ by the minimum number of left shifts and adjusts the exponent of the block to reflect that the coefficients have been left shifted. Then, circuit 524 provides the left-shifted coefficients to fine offset circuit 526. If MaxCoeff is greater than the threshold, circuit provides 650 the coefficients received from unit 524 to fine offset circuit 526.

While in the above description block floating point format is used to represent samples of signals, it should be appreciated that the present invention encompasses use of other formats, some of which may require manipulation in order to minimize information loss.

As indicated above, since the digital long samples which were fast Fourier transformed by FFT unit 520 were multiplied by a signal with a frequency equal to the coarse offset estimate, the frequency domain representation of the long symbols produced by scaling circuit 524 may not be a very accurate representation of the actual transmitted signal as transformed by the channel. The inaccuracy is partly due to the presence of a residual frequency offset in the frequency domain representation of the long symbols. The residual frequency offset can be estimated and compensated for using the fine offset estimate. To compensate for the residual frequency offset, circuit 526 convolves the sum, average, or scaled average of the scrambled frequency domain representations of the individual long symbols with a frequency domain representation of a signal that has a frequency equal to the fine offset estimate, fo. The frequency domain representation of a sine wave that is sampled for a finite period of time has the general shape of sin(x)/x, where x=πfT and T is the duration of a long symbol (e.g., 3.2 µs). The frequency domain representation of the sine wave varies as a function of fo. According to one embodiment, circuit 526 convolves three samples of the frequency domain representation of a sine wave, with frequency equal to the fine offset estimate, with the frequency domain representation of the long symbols as produced by circuit 524. The three samples of the frequency domain representation of the sine wave with frequency equal to fo are retrieved from memory 527 by fine offset circuit 526. In order to perform the convolution as rapidly as possible, memory 527 stores a table that has for various values of frequency, f, associated samples of the frequency domain representation of a sine wave with frequency equal to f. To retrieve the appropriate samples, circuit 526 indexes into the table based on fo. According to one embodiment, in the event that fo falls between two values of f in memory 527, circuit 526 retrieves the samples that are associated with the two values. Circuit 526 then interpolates between each sample of one value and the corresponding sample of the other value to produce an interpolated sample value. It should be appreciated that in an alternative embodiment interpolation may not be necessary because the table would have a very small step size between the various values of fo making it acceptable to simply choose the samples for the fo that is closest to the fine offset estimate being used as an index into the table. Circuit 526 then convolves the interpolated sample values with the frequency domain representation of the long symbols as received from scaling circuit 524. The output of circuit 526 is a frequency domain representation of the long symbols as received at the receiver and as adjusted for frequency offset between the transmitter and receiver. The output of circuit 526 is then provided to rotator 528.

As indicated above, if the timing of the long symbols is early, a least squares fit of a line through the phases of the pilots will be a line with a negative slope. It is very likely—and even desirable—that the sampling of the long symbols be early. Consequently, a plot of the phases of the pilots of the frequency domain representation of the long symbols produced by circuit 526 is likely to resemble four points which can have a least squares fit line with a negative slope passed between them, as in FIG. 4c. To produce a channel estimate with a flat phase response as a baseline, the phase of each subcarrier in the frequency domain representation of the long symbols needs to be corrected by multiplying each subcarrier by a vector whose angle is a function of the subcarrier number and the number of clock cycles the sampling was early.

To produce the flat phase response, arithmetic logic unit (ALU) 550 calculates the phase correction for subcarrier −26 (i.e., −(−26)π(number of samples early)/64) and provides it to vector generator 552 which produces a vector with an angle equal to the phase correction for subcarrier −26. Rotator 528 then multiplies the vector produced by generator 552 with the complex value for subcarrier −26 that is produced by fine offset circuit 526. To calculate the phase correction for subcarrier −25, ALU 550 simply adds −π (number of samples early)/64 to the phase correction for subcarrier −26. Vector generator 552 provides a vector with an angle equal to the phase correction for subcarrier −25 to rotator 528. ALU 550 repeats the process of adding −π(number of samples early)/64 to the previous phase correction that was calculated in order to generate the phase corrections up to subcarrier +26.

The output of the rotator 528 is a frequency domain representation of the long symbols which has been adjusted for both frequency offset and timing offset (i.e., flat phase response). Since the frequency domain representation produced by rotator 528 is likely to be noisy, according to one embodiment, the output of rotator 528 is filtered by a 7-tap finite impulse response filter (FIR) 530. One of ordinary skill in the art would appreciate that the nature of the FIR is a design consideration and that the present invention encompasses FIR with a number of taps other than 7 and even filters other than FIRs.

The smoothed or filtered output of filter 530 is the channel estimate and it is inverted by inverter 532 to produce an inverted channel estimate. The inverted channel estimate is applied to multiplexer 534, which forwards it to memory 536 for storage and later use in decoding data symbols. The process of calculating the inverted channel estimate is described by equation 5.0 below.

$$ChannelInverse_i = \frac{1}{I_i + jQ_i} = \frac{I_i - jQ_i}{I_i^2 + jQ_i^2} \qquad \text{Equation 5.0}$$

Where i varies from −26 to +26 and $I_i+jQ_i$ is the complex output of filter 530 for the $i^{th}$ subcarrier.

Returning to the output of filter 530, in addition to the filtered samples of the data subcarriers, filter 530 produces four filtered pilot signals. The four filtered long symbol pilot signals are sent to a pilot tracking unit that also receives the pilot signals of data symbols and uses the long symbol and data symbol pilots to track both phase and magnitude changes in order to compensate for magnitude changes, phase noise, timing drift, and frequency offset error between the receiver and transmitter.

Figure 7:
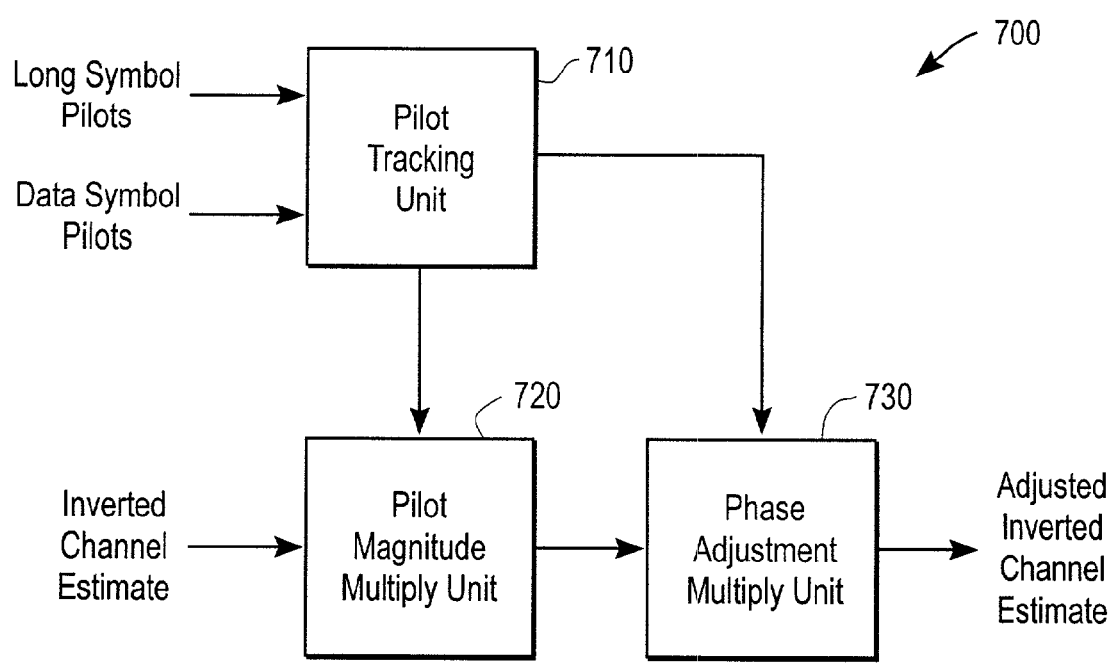
FIG. 7 illustrates a phase and magnitude tracking apparatus that produces an inverted channel estimate that has been adjusted for both phase and magnitude changes.

FIG. 7 illustrates a phase and magnitude tracking apparatus that produces an inverted channel estimate that has been adjusted for both phase and magnitude changes. Apparatus 700 includes pilot tracking unit 710 which tracks amplitude changes and phase changes. The phase of the pilots is not the only thing that changes during a frame of multiple data symbols in an OFDM signal. The magnitudes of the pilots may also change. In order to ensure proper decoding of data, according to one embodiment pilot magnitude variations are tracked and the inverted channel estimate is adjusted.

During receipt of a packet, the signal magnitude may vary due to the analog circuits or environmental factors. To account for pilot magnitude variations, a reference power must be first computed and saved. Unit 710 sums the powers of the 4 pilots of the long symbols and assigns them to a reference_power variable. The equation 6.0 below represents calculation of the reference_power.

$$Power = \sum_{i=-21,-7,7,21} real(pilot_i)^2 + imag(pilot_i)^2 \qquad \text{Equation 6.0}$$

According to one embodiment, pilot power is then computed for the pilots of the SIGNAL symbol (data_or_signal_symbol_power) using the above equation and is compared to reference_power. The inverted channel estimate is scaled by scaling factor Mag which is represented by equation 7.0 below.

$$Mag = \sqrt{\frac{reference\_power}{data\_or\_signal\_symbol\_power}} \qquad \text{Equation 7.0}$$

In the first data symbol, the pilot power of the pilots of the data symbol is compared to the reference power and the inverted channel estimate is scaled by the factor Mag using multiply unit 720. According to one embodiment, for data symbols after the first data symbol, the power of the pilots for the data symbol is filtered with a simple infinite impulse response filter: for example, filter_power[n+1]=presentdata-symbolpower/8+7*filter_power[n]/8. filter_power[n+1]is compared to the reference power, and Mag is calculated using filter_power[n+1]. The inverted channel estimate is then scaled by the factor Mag using multiply unit 720.

The scaling factor can be more easily evaluated in a base 2 system by performing the scale calculation in the log domain:

$$lgMag=0.5(log2(\text{reference\_power})-log2(\text{data\_or\_signal\_power}));$$

and $$Mag=2^{lgMag}$$

In a hardware implementation, the integer part of log2(n) is determined from the number of leading zeroes of the input; the fractional part via lookup table of the normalized input. According to one embodiment, the Mag output is computed in floating point format, the mantissa via lookup table of the lower bits of lgMag, and the exponent from the upper bits of lgMag. The Mag output is provided to multiplier 720 which scales the inverted channel estimate and provides the scaled inverted channel estimate to multiply unit 730.

Unit 710 also tracks phase changes using a single, unified mechanism. The mechanism involves, for each pilot of a data symbol, accumulation of the total change in phase relative to the phase observed in the long symbols to produce a total delta pilot phase (tdp), or total delta pilot. Making a least squares fit of the four tdps (one for each pilot) allows the tdp for each data subcarrier to be determined by a simple equation for a line that has the slope and phase offset determined by the least squares fit. The negated value of the tdp calculated for a given subcarrier is the amount by which the corresponding subcarrier of the inverted channel estimate (determined above at the output of memory 536) should be rotated.

As indicated above, pilot tracking unit 710 receives from filter 530 the complex values (I and Q components) for each of the four pilots in the long symbols. Pilot tracking unit 710 keeps track of the phase change between the pilots in the long symbols and the pilots in the data symbols. By keeping track of the phase changes, pilot tracking unit 710 is able to provide, for each data symbol that is received, indications of how the inverted channel estimate based on the long symbols needs to be adjusted to compensate for the timing drift, phase noise, and frequency offset that each data symbol is experiencing. To keep track of the phase changes, the unit 710 maintains a number of variables for each of the pilots.

Pilot carriers act as the reference tones and help to correct the channel distortion in communication systems. The purpose of the pilot phase tracking is to accumulating the phase difference for each data symbol relative to the long symbols while attempting to correct for the phase ambiguity, that is, the $2\pi$ phase jumps that inevitably occur in noisy environments. When the signal to noise ratio (SNR) at the receiver is high, the phase differences between symbols are small, so there is no ambiguity on the phase accumulation. However, when the SNR is relatively low, the phase differences between symbols could become large, so that it becomes difficult to detect where a $2\pi$ phase jump occurs and thus effectively maintain tracking of the pilot carrier. In a presently preferred embodiment, the pilot phase is measured within the range from $-\pi$ to $+\pi$, that is, the modulo $2\pi$ of the actual phase.

U.S. application Ser. No. 10/076,022, filed Feb. 14, 2002, entitled "An Efficient Pilot Tracking Method For OFDM Receivers," describes a mechanism for implementing a linear filter within the unit 710 to perform phase tracking. The unit 710 maintains the following variables for each of the pilots:

$p_{n+1}$=pilot phase of the most recent symbol n+1.

$p_n$=pilot phase of the previous symbol n.

$ta_{n+1}$=the timing adjustment phase, the amount of phase that needs to be added or subtracted from the phases of pilots due to timing having slipped from the desired timing backoff.

$$ta = \frac{\text{subcarrier\_number}\cdot\text{timing\_adjustment}\cdot\pi}{64}$$

where subcarrier_number takes on the values (−21,−7,+7,+21) and timing_adjustment is the number of clock cycles that the timing has slipped from the timing offset for the long symbols (permissible values are −1 (symbol timing sped up by a clock cycle), 0 (no timing adjustment), and +1 (symbol timing delayed by a clock cycle).

$dp_{n+1}$=new delta pilot phase (the difference in pilot phase between two consecutive symbols), $-\pi<=dp_{n+1}<+\pi$;

$dp_{n+1}=((p_{n+1}-p_n-ta_{n+1})+\pi)\text{mod}2\pi)-\pi$.

$dp_n$=the previous delta pilot phase.

wrap_adjust=[0, $2\pi,-2\pi$], the adjustment made to total change in phase for a pilot (tdp) when the phase change over two consecutive pilots is greater than a programmable threshold value pwt (typically ~$\pi$ radians). The condition of phase change over two consecutive pilots exceeding pwt is detected by evaluating pwt below and comparing pwt to the sum of $dp_{n+1}$ and $dp_n$.

pwt=$\pi$(1+pilot_wrap_threshold>>4), pilot_wrap_threshold is a configuration register which, according to one embodiment, holds values between 0 and 15 and >> is a right shift operation;

if $(dp_{n+1}+dp_n)$>pwt then
   wrap_adjust=−$2\pi$
else
   if $(dp_{n+1}+dp_n)$<−pwt then
     wrap_adjust=$2\pi$
   else wrap_adjust=0.

$tdp_{n+1}$=new total delta pilot phase, total amount of rotation of a pilot compared to the phase of the pilot from the long symbols;

$tdp_{n+1}=(tdp_n+ta)+dp_{n+1}+\text{wrap\_adjust}$ where $tdp_n$ is the previous total delta pilot phase.

After $tdp_{n+1}$ is evaluated, the previous pilot phase $p_n$, the previous delta pilot phase $dp_n$, and the previous total delta pilot phase $tdp_n$, are advanced for each of the four pilots: i.e., $p_n=p_{n+1}$, $dp_n=dp_{n+1}$ and $tdp_n=tdp_{n+1}$.

Since the modulo $2\pi$ function is a non-linear function, a non-linear filter implementation is more effective than a linear filter implementation. According to aspects of the present invention, non-linear filtering is applied to the phase of pilot carriers to correct $2\pi$ phase jumps more reliably. An exemplary non-linear filter according to aspects of the present invention was implemented and its performance was compared with that of the exemplary linear filter implementation as above. In this case and in general, use of non-linear filtering significantly improves the packet error rate (PER) at low SNR and extends the working range of the communication system and reduces the required transmitting power compared to linear filtering implementations such as the one detailed above.

Figure 8:
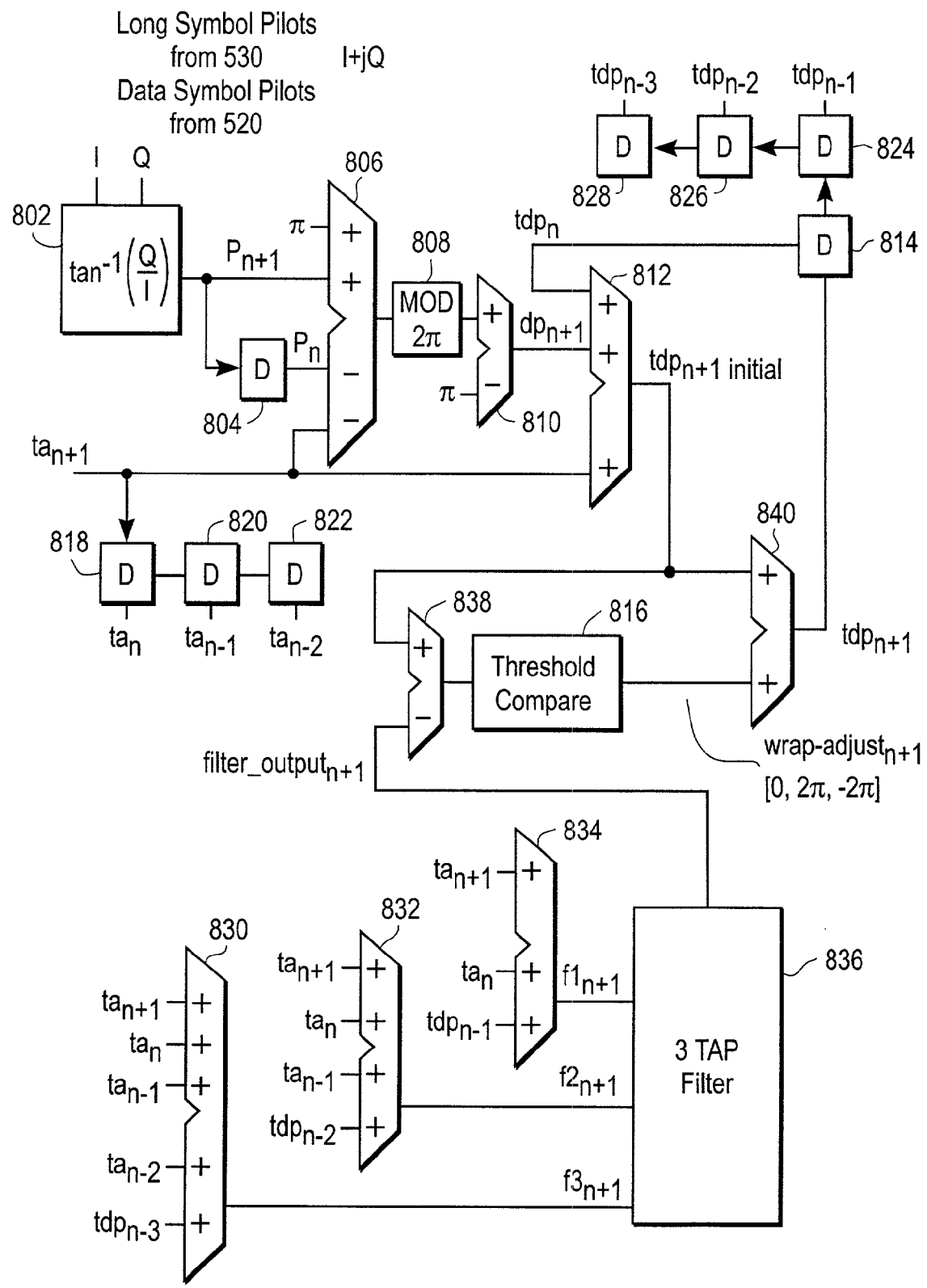
FIG. 8 illustrates a portion of an exemplary implementation of the phase tracking unit of FIG. 7 according to an aspect of the present invention.

FIG. 8 illustrates a portion 800 of an exemplary implementation of the phase tracking unit 710 of FIG. 7 according to an aspect of the present invention. The phase tracking unit 710 includes the phase tracking functionality 800 for each pilot carrier signal within a data symbol, in this case four pilot carrier signals. Each phase tracking functionality 800 performs phase tracking for a particular in the time domain.

According to an exemplary presently preferred embodiment, the unit 710 maintains the following variables for pilot tracking when implementing an exemplary non-linear filter 802:

$p_{n+1}$=pilot phase of the most recent symbol n+1.

$p_n$=pilot phase of the previous symbol n.

$ta_{n+1}$=the timing adjustment phase, the amount of phase that needs to be added or subtracted from the phases of pilots due to timing having slipped from the desired timing backoff.

$$ta = \frac{\text{subcarrier\_number(timing\_adjustment)}\pi}{64}$$

where subcarrier_number takes on the values (−21,−7,+7,+21) and timing_adjustment is the number of clock cycles that the timing has slipped from the timing offset for the long symbols (permissible values are −1 (symbol timing sped up by a clock cycle), 0 (no timing adjustment), and +1 (symbol timing delayed by a clock cycle).

$ta_n$, $ta_{n-1}$, $ta_{n-2}$=the delayed values of the timing adjustment phase ta.

$dp_{n+1}$=new delta pilot phase (the difference in pilot phase between two consecutive symbols), $-\pi<=dp_{n+1}<+\pi$;

$dp_{n+1}=((p_{n+1}-p_n-ta_{n+1}+\pi) \bmod 2\pi)-\pi$.

$tdp_{n+1}$=new total delta pilot phase, total amount of rotation of a pilot compared to the phase of the pilot from the long symbols;

$tdp_{n+1}=tdp_{n+1}$initial+wrap_adjust=$(tdp_n+ta_{n+1})+dp_{n+1}$+wrap_adjust, where $tdp_{n+1\ initial}$ is an initial total delta phase value that is used to calculate the value wrap_adjust.

$tdp_n$=the previous delta pilot phase.

$tdp_{n-1}$, $tdp_{n-2}$, $tdp_{n-3}$=the delayed values of the total delta pilot phase tdp.

filter_output$_{n+1}$=the non-linear filter output value. In a presently preferred embodiment, the filter output value is the output of a 3 tap modulo $8\pi$ median filter that has as its inputs (with accompanying respective delayed values of the timing adjustment phase ta, as shown in FIG. 8) $tdp_{n-1}$, $tdp_{n-2}$, and $tdp_{n-3}$. If all timing adjustment phases are zero, filter_output$_{n+1}$=mod_median($tdp_{n-1}$, $tdP_{n-2}$, $tdp_{n-3}$, range) where range is equal to $8\pi$ in the presently preferred embodiment using the 3 tap modulo $8\pi$ median filter.

wrap_adjust=[0, $2\pi$,$-2\pi$], the adjustment made to the initial total delta pilot phase value ($tdp_{n+1\ initial}$) when the total change in pilot phase over a number of pilots is greater than a programmable threshold value pwt (typically ~$\pi$ radians). The condition of total delta pilot phase change over a number of pilots exceeding pwt is detected by evaluating pwt below and comparing pwt to the difference of $tdp_{n+1\ initial}$ and the value filter_output$_{n+1}$.

pwt=$\pi(1+$pilot_wrap_threshold>>4), pilot_wrap_threshold is a configuration register which, according to one embodiment, holds values between 0 and 15 and >> is a right shift operation;

if ($tdp_{n+1\ initial}$−filter_output$_{n+1}$)>pwt then
    wrap_adjust=$-2\pi$
else
    if ($tdp_{n+1\ initial}$−filter_output$_{n+1}$)<−pwt then
        wrap_adjust=$2\pi$
    else wrap_adjust=0.

that is, if the absolute value of the difference between $tdp_{n+1\ initial}$ and filter output exceeds pwt, then wrap_adjust is set equal to $-2\pi$ if $tdp_{n+1\ initial}$ is greater than filter_output, and wrap_adjust is set equal to $2\pi$ if $tdp_{n+1\ initial}$ is less than filter_output. Otherwise, wrap_adjust is equal to zero.

After $tdp_{n+1}$ is evaluated, the previous pilot phase $p_n$, the previous total delta pilot phases tdp, and the previous timing adjustment phases ta, are advanced for each of the four pilots: i.e., $p_n=p_{n+1}$, $tdp_n=tdp_{n+1}$, $tdp_{n-1}=tdp_n$, $tdp_{n-2}=tdp_{n-1}$, $tdp_{n-3}=tdp_{n-2}$, $ta_n=ta_{n+1}$, $ta_{n-1}=ta_n$, and $ta_{n-2}=ta_{n-1}$.

Continuing with reference to FIG. 8, each phase tracking functionality 800 of pilot tracking unit 710 first receives from filter 530 the complex values (I and Q components) for its respective pilot in the long symbols at inverse tangent block 802. After the long symbol complex values have been received, inverse tangent block 802 next receives from FFT unit 520 the complex values (I and Q components) for its respective pilot in the data symbols on a symbol by symbol basis. Each complex value is converted by the inverse tangent block 802 to a phase angle value according to the well-known relationship:

$$Ang[I+jQ] = \text{Tan}^{-1}\left(\frac{Q}{I}\right) = p_{n+1}$$

On a symbol by symbol basis, the pilot phase $p_{n+1}$ of the most recent symbol n+1 and the pilot phase $p_n$ of the previous symbol n from delay element 804 are combined at accumulator 806 with the timing adjustment phase $ta_{n+1}$ for the most recent symbol n+1 and an adjustment phase of $\pi$ radians. The result is processed at mod $2\pi$ block 808, the output of which is presented to difference generator 810 at which an adjustment phase of $\pi$ radians is subtracted to provide the delta pilot phase $dp_{n+1}$ for the most recent symbol n+1:

$dp_{n+1}=((p_{n+1}-p_n-ta_{n+1}+\pi)\bmod 2\pi)-\pi$; $-\pi<=dp_{n+1}<+\pi$.

Accumulator 812 generates the initial total delta pilot phase $tdp_{n+1\ initial}$ for the most recent symbol n+1 by combining the total delta pilot phase $tdp_n$ of the previous symbol n from delay element 814 together with the value $dp_{n+1}$, and the timing adjustment phase $ta_{n+1}$:

$tdp_{n+1\ initial}=(tdp_n+ta_{n+1})+dp_{n+1}$.

Accumulator 840 generates the total delta pilot phase $tdp_{n+1}$ for the most recent symbol n+1 by combining the initial total delta pilot phase $tdp_{n+1\ initial}$ and the value wrap_adjust:

$tdp_{n+1}=tdp_{n+1\ initial}+$wrap_adjust=$(tdp_n+ta_{n+1})+dp_{n+1}+$wrap_adjust.

The timing adjustment phase $ta_{n+1}$ is input to a first delay element 818 of a cascade of delay elements 818, 820, 822 to generate the delayed values of the timing adjustment phase $ta_n$, $ta_{n-1}$, and $ta_{n-2}$, respectively.

The total delta pilot phase $tdp_{n+1}$ is input to the delay element 814 of a cascade of delay elements 824, 826, 828 to generate the delayed values of the total delta pilot phase $tdp_n$, $tdp_{n-1}$, $tdp_{n-2}$, and $tdp_{n-3}$ respectively.

The timing adjustment phase $ta_{n+1}$ and the delayed values generated by delay elements 818, 820, 822, 824, 826, 828 are input to three accumulators 830, 832, 834 to generate filter input values f1, f2, and f3:

$$f1 = ta_{n+1} + ta_n + tdp_{n-1}$$

$$f2 = ta_{n+1} + ta_n + ta_{n-1} + tdp_{n-2}$$

$$f3 = ta_{n+1} + ta_n + ta_{n-1} + ta_{n-2} + tdp_{n-3}.$$

These values are input to the 3 tap filter 836. In a presently preferred embodiment according to aspects of the present invention the filter 836 is implemented as a 3 tap modulo $8\pi$ median filter, that is, a non-linear filter, having an output value:

$$filter\_output_{n+1} = mod\_median(f1, f2, f3, range)$$

where range is equal to $8\pi$ in a presently preferred embodiment. This phase value is, of course, exemplary, and other values may be used as suitable. The function mod_median uses the following compare values:

$$compare12 = \left(\left(\left(f1 - f2 + \frac{range}{2}\right) mod\ range\right) - \frac{range}{2}\right) > 0;$$

$$compare23 = \left(\left(\left(f2 - f3 + \frac{range}{2}\right) mod\ range\right) - \frac{range}{2}\right) > 0;$$

$$compare31 = \left(\left(\left(f3 - f1 + \frac{range}{2}\right) mod\ range\right) - \frac{range}{2}\right) > 0;$$

and is implemented as follows:
if compare12 then
  if compare23 then
    $filter\_output_{n+1} = f2$;
  else if compare31 then
    $filter\_output_{n+1} = f1$;
  else
    $filter\_output_{n+1} = f3$;
  end
else
  if not compare31 then
    $filter\_output_{n+1} = f1$;
  else if compare23 then
    $filter\_output_{n+1} = f3$;
  else
    $filter\_output_{n+1} = f2$;
  end
end.

Several examples of the operation of the non-linear filter 836 are described below. One of ordinary skill in the art would appreciate that the nature of the non-linear filter is a design consideration and that the present invention is not limited to the non-linear filter 836 but rather encompasses any of a wide variety of suitable non-linear filters, including filters with a number of taps other than 3 and filters implementing functions other than a median function to correct for phase ambiguity in phase tracking.

The non-linear filter output value $filter\_output_{n+1}$ and the initial total delta pilot phase $tdp_{n+1\ initial}$ are provided to difference generator 838 which in turn provides $$tdp_{n+1} - filter\_output_{n+1}$$

to threshold compare unit 816. The value wrap_adjust is generated from threshold compare unit 816 and takes on one of the values 0, $2\pi$, and $-2\pi$ radians. If the absolute value of the difference between $tdp_{n+1\ initial}$ and filter_output exceeds the programmable threshold pwt, then wrap_adjust is set equal to $-2\pi$ if $tdp_{n+1\ initial}$ is greater than filter_output, and wrap_adjust is set equal to $2\pi$ if $tdp_{n+1\ initial}$ is less than filter_output. Otherwise, wrap_adjust is equal to zero. The value wrap_adjust is provided to the accumulator 840 to generate the output of the phase tracking functionality 800, that is, the total delta pilot phase $tdp_{n+1}$ for the most recent symbol n+1 as described above.

EXAMPLES COMPARING NON-LINEAR FILTERING WITH LINEAR FILTERING FOR TRACKING AT A GIVEN PILOT FREQUENCY IN THE TIME DOMAIN (Assuming Timing Adjustment Phase $ta_5 = ta_4 = ta_3 = ta_2 = ta_1 = 0$ Radians and pwt=$1.1\pi$ Radians)

Example 1

Assume that the pilot phase values p for this example are the following:
$p_1 = 0$ radians for symbol 1
$p_2 = 0.6\pi$ radians for symbol 2
$p_3 = -0.8\pi$ radians for symbol 3
$p_4 = 0.6\pi$ radians for symbol 4
$p_5 = 0$ radians for symbol 5 then the delta pilot phase values dp are the following:
$dp_1 = 0$ radians for symbol 1
$dp_2 = ((p_2 - p_1 + \pi) mod 2\pi) - \pi$
  $= ((0.6\pi - 0 + \pi) mod 2\pi) - \pi = ((1.6\pi) mod 2\pi) - \pi = 1.6\pi - \pi$
  $= 0.6\pi$ radians for symbol 2
$dp_3 = ((p_3 - p_2 + \pi) mod 2\pi) - \pi$
  $= ((-0.8\pi - 0.67\pi + \pi) mod 2\pi) - \pi = ((-0.4\pi) mod 2\pi) - \pi = 1.6\pi - \pi$
  $= 0.6\pi$ radians for symbol 3
$dp_4 = ((p_4 - p_3 + \pi) mod 2\pi) - \pi$
  $= ((0.6\pi - (-0.8\pi) + \pi) mod 2\pi) - \pi = ((2.4\pi) mod 2\pi) - \pi = 0.4\pi - \pi$
  $= -0.6\pi$ radians for symbol 4
$dp_5 = ((p_5 - p_4 + \pi) mod 2\pi) - \pi$
  $= ((0 - (0.6\pi) + \pi) mod 2\pi) - \pi = ((0.4\pi) mod 2\pi) - \pi = 0.4\pi - \pi$
  $= -0.6\pi$ radians for symbol 5 and the total delta pilot phase values tdp with no $2\pi$ correction mechanism are the following:
$tdp_1 = 0$ radians for symbol 1
$tdp_2 = tdp_1 + dp_2$
  $= 0 + 0.6\pi$
  $= 0.6\pi$ radians for symbol 2
$tdp_3 = tdp_2 + dp_3$
  $= 0.6\pi + 0.6\pi$
  $= 1.2\pi$ radians for symbol 3
$tdp_4 = tdp_3 + dp_4$
  $= 1.2\pi + -0.6\pi$
  $= 0.6\pi$ radians for symbol 4
$tdp_5 = tdp_4 + dp_5$
  $= 0.6\pi + -0.6\pi$
  $= 0$ radians for symbol 5

By contrast, the total delta pilot phase values tdp with the linear filter described above are the following:

wrap_adjust$_1$=0 radians
tdp$_1$=0 radians for symbol 1
wrap_adjust$_2$=0 radians (dp$_2$+dp$_1$=0.6π+0 =0.6π; not >pwt or <-pwt)
tdp$_2$=tdp$_1$+dp$_2$+wrap_adjust$_2$
=0+0.6π+0
=0.6π radians for symbol 2
wrap_adjust$_3$=-2π radians (dp$_3$+dp$_2$=0.6π+0.6π= 1.2π>pwt)
tdp$_3$=tdp$_2$+dp$_3$+wrap_adjust$_3$
=0.6π+0.6π+-2π
=-0.8π radians for symbol 3
wrap_adjust$_4$=0 (dp$_4$+dp$_3$=-0.6π+0.6π=0; not >pwt or <-pwt)
tdp$_4$=tdp$_3$+dp$_4$+wrap_adjust$_4$
=-0.8π+-0.67π+0
=-1.4π radians for symbol 4
wrap_adjust$_5$=2π (dp$_5$+dp$_4$=-0.6π-0.6π=-1.2π<-pwt)
tdp$_5$=tdp$_4$+dp$_5$+wrap_adjust$_5$
=-1.4π+-0.6π+2π
=0 radians for symbol 5

With the programmable threshold pwt set to 1.1π, a -2π correction occurs at symbol 3 and a +2π correction occurs at symbol 5.

The total delta pilot phase values tdp for this example with the non-linear filter 836 of FIG. 8 are the following:

tdp$_{1\ initial}$=0 radians
f1$_1$=f2$_1$=f3$_1$=filter_output$_1$=wrap_adjust$_1$=0 radians
tdp$_1$=tdp$_{1\ initial}$+wrap_adjust$_1$
=0+0=0 radians for symbol 1
tdp$_{2\ initial}$=tdp$_1$+dp$_2$=0+0.6π=0.6π radians
f1$_2$=f2$_2$=f3$_2$=filter_output$_2$=wrap_adjust$_2$=0 radians
tdp$_2$=tdp$_{2\ initial}$+wrap_adjust$_2$
=0.6π+0
=0.6π radians for symbol 2
tdp$_{3\ initial}$=tdp$_2$+dp$_3$=0.6π+0.6π=1.2π radians
f1$_3$=tdp$_1$=0 radians
f2$_3$=f3$_3$=filter_output$_3$=wrap_adjust$_3$=0 radians
tdp$_3$=tdp$_{3\ initial}$+wrap_adjust$_3$
=1.2π+0
=1.2π radians for symbol 3
tdp$_{4\ initial}$=tdp$_3$+dp$_4$=1.2π+-0.67π=0.67π radians
f1$_4$=tdp$_2$=0.67 radians
f2$_4$=tdp$_1$=0 radians
f3$_4$=filter_output$_4$=wrap_adjust$_4$=0 radians
tdp$_4$=tdp$_{4\ initial}$+wrap_adjust$_4$
=0.6π+0
=0.6π radians for symbol 4
tdp$_{5\ initial}$=tdp$_4$+dp$_5$=0.6π+-0.6π=0 radians
f1$_5$=tdp$_3$=1.2π radians
f2$_5$=tdp$_2$=0.6π radians
f3$_5$=tdp$_1$=0 radians
range=8π radians
compare 12$_5$=(((f1$_5$-f2$_5$+4π)mod8π)-4π)=(((1.2π-0.6π+4π)mod8π)-4π)=
=(((0.6π+4π)mod8π)-4π)=0.6π>0=TRUE
compare23$_5$=(((f2$_5$-f3$_5$+4π)mod8π)-4π)=(((0.67π-0+47π)mod8π)-4π)=
=(((0.6π+4π)mod8π)-4π)=0.67>0=TRUE
compare31$_5$=(((f3$_5$-f1$_5$+4π)mod8π)-4π)=(((0-1.2π+4π)mod8π)-4π)=
=(((-1.2π+4π)mod8π)-4π)=-1.2π>0 =FALSE Since compare12$_5$ is TRUE and compare23$_5$ is TRUE, then
filter_output$_5$=f2$_5$=0.6π radians
wrap_adjust$_5$=0 radians (tdp$_{5\ initial}$-filter_output$_5$=0-0.6π=0.6π; not>pwt or <-pwt)
tdp$_5$=tdp$_{5\ initial}$+wrap_adjust$_5$
=0+0
=0 radians for symbol 5

With the non-linear filter 836 of FIG. 8, no corrections to the total delta pilot phase values are made in this example. For symbol 5, the output of the filter 836 is 0.6π, and the absolute value of the difference between tdp$_{5\ initial}$ and the filter output is 0.6π, which is less than the threshold pwt, so wrap_adjust5 is set equal to zero and no correction is made to tdp$_{5\ initial}$ Example 1 is intended to demonstrate that the linear filtering and the non-linear filtering phase tracking can yield different, but equally valid, results in certain situations. In addition, the example demonstrates that non-linear filtering phase tracking is less sensitive than the linear filtering phase tracking, thus minimizing the chance that an incorrect 2π pilot phase noise correction is made.

Example 2

Assume that the pilot phase values p for this example are the following:
p$_1$=0 radians for symbol 1
p$_2$=0.8π radians for symbol 2
p$_3$=-π radians for symbol 3
p$_4$=-0.4π radians for symbol 4
p$_5$=0 radians for symbol 5 then the delta pilot phase values dp are the following:
dp$_1$=0 radians for symbol 1
dp$_2$=((p$_2$-p$_1$+π)mod2π)-π
=((0.8π-0+π)mod2π)-π=((1.8π)mod2π)-π=1.8π-π
=0.8π radians for symbol 2
dp$_3$=((p$_3$-p$_2$+π)mod2π)-π
=((-π-0.8π+π)mod2π)-π=((-0.8π)mod2π)-π=1.2π-π
=0.2π radians for symbol 3
dp$_4$=((p$_4$-p$_3$+π)mod2π)-π
=((-0.4π(-π)+π)mod2π)-π=((1.6π)mod2π)-π=1.6π-π
=0.6π radians for symbol 4
dp$_5$=((p$_5$-p$_4$+π)mod2π)-π
=((0-(-0.4π)+π)mod2π)-π=((1.4π)mod2π)-π=1.4π-π
=0.4π radians for symbol 5 and the total delta pilot phase values tdp with no 2π correction mechanism are the following:
tdp$_1$=0 radians for symbol 1
tdp$_2$tdp$_1$+dp$_2$
=0+0.87π
=0.8π radians for symbol 2
tdp$_3$=tdp$_2$+dp$_3$
=0.8π+0.2π
=π radians for symbol 3
tdp$_4$=tdp$_3$+dp$_4$
=7+0.6π
=1.6π radians for symbol 4
tdp$_5$=tdp$_4$+dp$_5$
=1.6π+0.4π
=2π radians for symbol 5

By contrast, the total delta pilot phase values tdp with the linear filter described above are the following:

wrap_adjust$_1$=0 radians tdp$_1$=0 radians for symbol 1 wrap_adjust$_2$=0 radians (dp$_2$+dp$_1$=0.8π+0 =0.8π; not>pwt or<−pwt)

tdp$_2$=tdp$_1$+dp$_2$+wrap_adjust$_2$

=0+0.8π+0

=0.8π radians for symbol 2 wrap_adjust$_3$=0 radians (dp$_3$+dp$_2$=0.2π+0.8π=π; not>pwt or<−pwt)

tdp$_3$=tdp$_2$+dp$_3$+wrap_adjust$_3$

=0.8π+0.2π+0

=π radians for symbol 3 wrap_adjust$_4$=0 (dp$_4$+dp$_3$=0.6π+0.2π=0.8π; not>pwt or<−pwt)

tdp$_4$=tdp$_3$+dp$_4$+wrap_adjust$_4$

=π+0.6π+0

=1.6π radians for symbol 4 wrap_adjust$_5$=0 (dp$_5$+dp$_4$=0.4π+0.6π=π; not>pwt or<−pwt)

tdp$_5$=tdp$_4$+dp$_5$+wrap_adjust$_5$

=1.6π+0.4π+0

=2π radians for symbol 5

The linear filter thus fails to detect a 2π phase jump.

By contrast, the total delta pilot phase values tdp for this example using the non-linear filter 836 of FIG. 8 are the following:

tdp$_{1\ initial}$=0 radians f1$_1$=f2$_1$=f3$_1$=filter_output$_1$=wrap_adjust$_1$=0 radians tdp$_1$=tdp$_{1\ initial}$+wrap_adjust$_1$ =0+0=0 radians for symbol 1 tdp$_2$ initial=tdp$_1$+dp$_2$=0+0.8π=0.8π radians f1$_2$=f2$_2$=f3$_2$=filter_output$_2$=wrap_adjust$_2$=0 radians tdp$_2$=tdp$_{2\ initial}$+wrap_adjust$_2$

=0.8π+0

=0.8π radians for symbol 2 tdp$_{3\ initial}$=tdp$_2$+dp$_3$=0.8π+0.2π=π radians f1$_3$=tdp$_1$=0 radians f2$_3$=f3$_3$=filter_output$_3$=wrap_adjust$_3$=0 radians tdp$_3$=tdp$_{3\ initial}$+wrap_adjust$_3$

=π+0

=π radians for symbol 3 tdp$_{4\ initial}$=tdp$_3$+dp$_4$=π+0.6π=1.6π radians f1$_4$=tdp$_2$=0.8π radians f2$_4$=tdp$_1$=0 radians f3$_4$=filter_output4=wrap_adjust$_4$=0 radians tdp$_4$=tdp$_{4\ initial}$+wrap_adjust$_4$

=1.6π+0

=1.6π radians for symbol 4 tdp$_{5\ initial}$=tdp$_4$+dp$_5$=1.6π+0.4π=2π radians f1$_5$=tdp$_3$=π radians f2$_5$=tdp$_2$=0.8π radians f3$_5$=tdp$_1$=0 radians range=8π radians compare12$_5$=(((f1$_5$−f2$_5$+4π)mod8π)−4π)=(((π−0.8π+4π)mod8π)−4π)=

=(((0.2π+4π)mod8π)−4π)=0.2π>0=TRUE compare23$_5$=(((f2$_5$−f3$_5$+4π)mod8π)−4π)=(((0.8π−0+4π)mod8π)−4π)=

=(((0.8π+4π)mod8π)−4π)=0.8π>0=TRUE compare31$_5$=(((f3$_5$−f1$_5$+4π)mod8π)−4π)=(((0−π+4π)mod8π)−4)=

=(((−π+4π)mod8π)−4π)=−π>0=FALSE

Since compare12$_5$ is TRUE and compare23$_5$ is TRUE, then filter_output$_5$=f2$_5$=0.8π radians wrap_adjust$_5$=−2π radians (tdp$_{5\ initial}$−filter_output$_5$=2π−0.8π=1.2π; not>pwt or <−pwt)

tdp$_5$=tdp$_{5\ initial}$+wrap_adjust$_5$

=2π+−2π

=0 radians for symbol 5

With the non-linear filter 836 of FIG. 8, a correction occurs at symbol 5. For symbol 5, the output of the filter 836 is 0.8π, and the absolute value of the difference between tdp$_{5\ initial}$ and the filter output is 1.2π, which is greater than the programmable threshold pwt of 1.1π, so wrap_adjust5 is set equal to −2π and a correction is made to tdp$_{5\ initial}$ to produce a final tdp5 of zero radians.

Example 2 is intended to demonstrate that the non-linear filtering phase tracking can appropriately detect a 2π jump in phase in the total delta phase where the linear filtering phase tracking fails to do so.

The exemplary phase tracking unit 710 may include additional functionality besides the exemplary functionality 800 for phase tracking as suitable. For example, in a presently preferred embodiment according to aspects of the present invention, the total value of tdp is bounded by +/−16π boundary values so that a correction phase of 8π is applied to adjust the value of tdp downward in absolute terms for each pilot carrier when any pilot carrier tdp exceeds +/−12π within the same symbol in absolute terms. The total delta pilot phase tdp thus can have up to an 8π jump between symbols for the same pilot. The filter 836 is thus implemented as a modulo 8π filter to account for the up to 8π variance in tdp between symbols for the same pilot. These phase values are, of course, exemplary, and other values may be used as suitable.

As a further example, in a presently preferred embodiment according to aspects of the present invention, not only is a non-linear filter such as filter 836 of FIG. 8 applied along the time domain for each pilot carrier independently; the phase tracking unit 710 also implements non-linear filtering in the frequency domain via crossover detection of pilot carriers in the same symbol.

Figure 9:
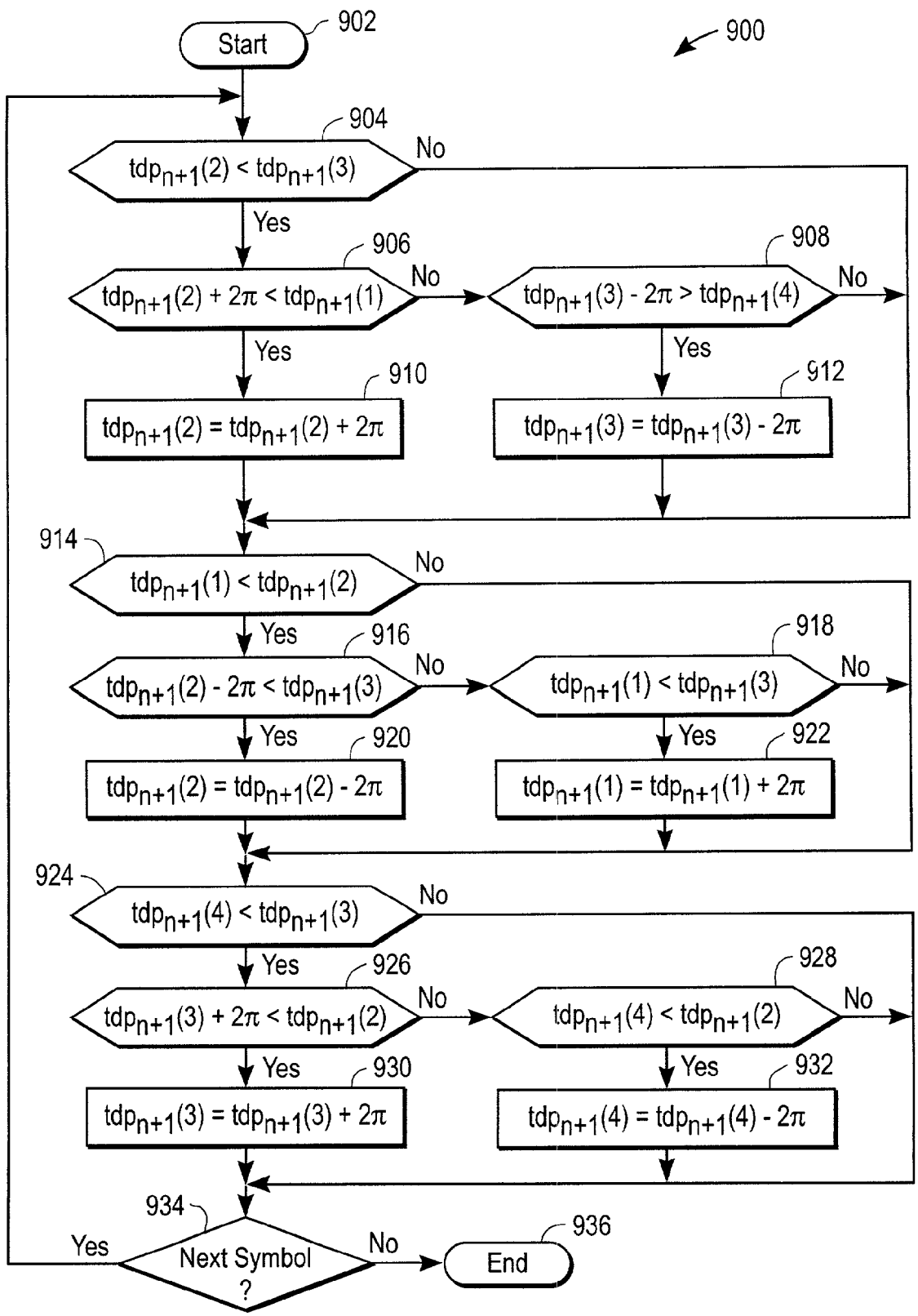
FIG. 9 illustrates an exemplary crossover detection algorithm for pilot carrier signals to be used in the phase tracking unit of FIG. 7 according to another aspect of the present invention.

FIG. 9 illustrates an exemplary crossover detection algorithm 900 for pilot carrier signals to be used in the phase tracking unit 710 according to another aspect of the present invention. The algorithm assumes that N=4 pilot carriers are compared with each other, although it should be understood that crossover detection according to aspects of the present invention is not limited to N=4 pilot carriers. Rather, any number of pilot carriers may be used as suitable and an extension of the algorithm to N pilot carriers is described below.

As described below, according to one embodiment, a timing_backoff register specifies the number of samples to back off from the end of each symbol. When the value timing_backoff is set to 4, that is, 4 samples (40 MHz sampling rate) from the symbol boundary, then the ideal (i.e. without noise) total delta pilot phases tdp$_{n+1}$(pilot #) for the N=4 pilots in each symbol will have the following properties:

tdp$_{n+1}$(1)>tdp$_{n+1}$(2)>tdp$_{n+1}$(3)>tdp$_{n+1}$(4) for the most recent data symbol n+1.

where pilot 1 has subcarrier number −21, pilot 2 has subcarrier number −7, pilot 3 has subcarrier number 7, and pilot 4 has subcarrier number 21.

The phase is represented by $e^{j2\pi ft}$, and between pilot carriers:

$$df = \left(\frac{subcarrier\#difference}{totalsubcarriers}\right)(frequency between subcarriers)$$

$$= \left(\frac{14}{64}\right)(20 \text{ MHz})$$

$$= 4.375 \text{ MHz}$$

$$dt = \left(\frac{timing\_backoff}{sampling\_rate}\right)$$

$$= \left(\frac{4 samples}{40 \text{ MHz}}\right)$$

$$= 100 \text{ nanoseconds}$$

so that the ideal difference or gap between $tdp_{n+1}$ is given by the following:

$$2\pi df dt = 2\pi(4.375 \text{ MHz})(100 \text{ ns}) = 0.875\pi.$$

Crossover detection exploits the above properties, i.e., the ideal difference between, and the expected order (i.e. without noise) of, the total delta pilot phases, in order to perform phase tracking, particularly in the case of correcting for pilot $2\pi$ ambiguity. The goal of crossover detection is to correct for any crossover between total delta pilot phases $tdp_{n+1}$ for the most recent symbol n+1 without creating any further crossover between total delta pilot phases $tdp_{n+1}$. Crossover can be defined as two or more total delta pilot phases being out of order as compared with the expected order (i.e. without noise).

The crossover detection algorithm for N=4 pilot carriers per symbol is the following:

Step 1: Correct any $tdp_{n+1}(2)$ and $tdp_{n+1}(3)$ crossover
  if $tdp_{n+1}(2)<tdp_{n+1}(3)$ then
    if $tdp_{n+1}(2)+2\pi<tdp_{n+1}(1)$ then
      $tdp_{n+1}(2)=tdp_{n+1}(2)+2\pi$
    else if $tdp_{n+1}(3)-2\pi>tdp_{n+1}(4)$ then
      $tdp_{n+1}(3)=tdp_{n+1}(3)-2\pi$;
Step 2: Correct $tdp_{n+1}(1)$
  if $tdp_{n+1}(1)<tdp_{n+1}(2)$ then
    if $tdp_{n+1}(2)-2\pi>tdp_{n+1}(3)$ then
      $tdp_{n+1}(2)=tdp_{n+1}(2)-2\pi$
    else if $tdp_{n+1}(1)<tdp_{n+1}(3)$ then
      $tdp_{n+1}(1)=tdp_{n+1}(1)+2\pi$;
Step 3: Correct $tdp_{n+1}(4)$
  if $tdp_{n+1}(4)>tdp_{n+1}(3)$ then
    if $tdp_{n+1}(3)+2\pi<tdp_{n+1}(2)$ then
      $tdp_{n+1}(3)=tdp_{n+1}(3)+2\pi$
    else if $tdp_{n+1}(4)>tdp_{n+1}(2)$ then
      $tdp_{n+1}(4)=tdp_{n+1}(4)-2\pi$.

Referring again to FIG. 9, the algorithm 900 begins at the start position 902 and processing of the data symbol n+1 continues to step 904 where the total delta pilot phase for pilot 2 subcarrier number −7, $tdp_{n+1}(2)$, is compared with the total delta pilot phase for pilot 3 subcarrier number 7, $tdp_{n+1}(3)$. At step 904, if $tdp_{n+1}(2)$ is not less than $tdp_{n+1}(3)$, then processing continues to step 914. At step 904, if $tdp_{n+1}(2)$ is less than $tdp_{n+1}(3)$, then processing advances to step 906 to determine whether $tdp_{n+1}(2)$ would be less than the total delta pilot phase for pilot 1 subcarrier number −22, $tdp_{n+1}(1)$, if $2\pi$ were added to $tdp_{n+1}(2)$. At step 906, if $tdp_{n+1}(2)$ plus $2\pi$ is less than $tdp_{n+1}(1)$, then processing continues to step 910. At step 910, $tdp_{n+1}(2)$ is set equal to $tdp_{n+1}(2)$ plus $2\pi$ and processing advances to step 914.

Returning to step 906, if $tdp_{n+1}(2)$ plus $2\pi$ is not less than $tdp_{n+1}(1)$, then processing continues to step 908 to determine whether $tdp_{n+1}(3)$ would be greater than the total delta pilot phase for pilot 4 subcarrier number 22, $tdp_{n+1}(4)$, if $2\pi$ were subtracted from $tdp_{n+1}(3)$. At step 908, if $tdp_{n+1}(3)$ minus $2\pi$ is not greater than $tdp_{n+1}(4)$, then processing advances to step 914. At step 908, if $tdp_{n+1}(3)$ minus $2\pi$ is greater than $tdp_{n+1}(4)$, then processing continues to step 912. At step 912, $tdp_{n+1}(3)$ is set equal to $tdp_{n+1}(3)$ minus $2\pi$ and processing advances to step 914.

At step 914, $tdp_{n+1}(1)$ is compared with $tdp_{n+1}(2)$. At step 914, if $tdp_{n+1}(1)$ is not less than $tdp_{n+1}(2)$, then processing continues to step 924. At step 914, if $tdp_{n+1}(1)$ is less than $tdp_{n+1}(2)$, then processing advances to step 916 to determine whether $tdp_{n+1}(2)$ would be greater than $tdp_{n+1}(3)$ if $2\pi$ were subtracted from $tdp_{n+1}(2)$. At step 916, if $tdp_{n+1}(2)$ minus $2\pi$ is greater than $tdp_{n+1}(3)$, then processing continues to step 920. At step 920, $tdp_{n+1}(2)$ is set equal to $tdp_{n+1}(2)$ minus $2\pi$ and processing advances to step 924. Returning to step 916, if $tdp_{n+1}(2)$ minus $2\pi$ is not greater than $tdp_{n+1}(3)$, then processing continues to step 918 to determine whether $tdp_{n+1}(1)$ is less than $tdp_{n+1}(3)$. At step 918, if $tdp_{n+1}(1)$ is not less than $tdp_{n+1}(3)$, then processing advances to step 924. At step 918, if $tdp_{n+1}(1)$ is less than $tdp_{n+1}(3)$, then processing continues to step 922. At step 922, $tdp_{n+1}(1)$ is set equal to $tdp_{n+1}(1)$ plus $2\pi$ and processing advances to step 924.

At step 924, $tdp_{n+1}(4)$ is compared with $tdp_{n+1}(3)$. At step 924, if $tdp_{n+1}(4)$ is not greater than $tdp_{n+1}(3)$, then processing continues to step 934. At step 924, if $tdp_{n+1}(4)$ is greater than $tdp_{n+1}(3)$, then processing advances to step 926 to determine whether $tdp_{n+1}(3)$ would be less than $tdp_{n+1}(2)$ if $2\pi$ were added to $tdp_{n+1}(3)$. At step 926, if $tdp_{n+1}(3)$ plus $2\pi$ is less than $tdp_{n+1}(2)$, then processing continues to step 930. At step 930, $tdp_{n+1}(3)$ is set equal to $tdp_{n+1}(3)$ plus $2\pi$ and processing advances to step 934. Returning to step 926, if $tdp_{n+1}(3)$ plus $2\pi$ is not less than $tdp_{+1}(2)$, then processing continues to step 928 to determine whether $tdp_{n+1}(4)$ is greater than $tdp_{n+1}(2)$. At step 928, if $tdp_{n+1}(4)$ is not greater than $tdp_{n+1}(2)$, then processing advances to step 934. At step 928, if $tdp_{n+1}(4)$ is greater than $tdp_{n+1}(2)$, then processing continues to step 932. At step 932, $tdp_{n+1}(4)$ is set equal to $tdp_{n+1}(4)$ minus $2\pi$ and processing advances to step 934. At step 934, crossover detection processing for the symbol n+1 has concluded, and the algorithm 900 determines whether a next symbol is to be processed. If so, the next symbol is designated symbol n+1 and the symbol that was formerly designated as symbol n+1 becomes symbol n and processing returns to step 904. If no next symbol is to be processed, then the algorithm terminates at step 936.

Generally, crossover detection can be applied to N pilot carriers, as shown by the following algorithm (where $N \geq 4$):

Step 1: Repeat for k=2 to N−2 pilots
  to correct for any crossover between $tdp_{n+1}(k)$ and $tdp_{n+1}(k+1)$
  if $tdp_{n+1}(k)<tdp_{n+1}(k+1)$ then
    if $tdp_{n+1}(k)+2\pi <tdp_{n+1}(k-1)$ then
      $tdp_{n+1}(k)=tdp_{n+1}(k)+2\pi$
    else if $tdp_{n+1}(k+1)-2\pi>tdp_{n+1}(k+2)$ then
      $tdp_{n+1}(k+1)=tdp_{n+1}(k+1)-2\pi$;
Step 2: Correct $tdp_{n+1}(1)$ (first pilot)
  if $tdp_{n+1}(1)<tdp_{n+1}(2)$ then
    if $tdp_{n+1}(2)-2\pi>tdp_{n+1}(3)$ then
      $tdp_{n+1}(2)=tdp_{n+1}(2)-2\pi$
    else if $tdp_{n+1}(1)<tdp_{n+1}(3)$ then
      $tdp_{n+1}(1)=tdp_{n+1}(1)+2\pi$;

Step 3: Correct $tdp_{n+1}(N)$ (Nth pilot)
 if $tdp_{n+1}(N) > tdp_{n+1}(N-1)$ then
  if $tdp_{n+1}(N-1)+2\pi < tdp_{n+1}(N-2)$ then
   $tdp_{n+1}(N-1) = tdp_{n+1}(N-1)+2\pi$
  else if $tdp_{n+1}(N) > tdp_{n+1}(N-2)$ then
   $tdp_{n+1}(N) = tdp_{n+1}(N) - 2\pi$.

where k is the index to pilot carriers and n+1 is the most recent data symbol. Generally there will be a tradeoff between performance and cost as N is increased.

For communication systems with multiple pilot carriers, there are fixed relationships between the pilot carrier phases at any sample time in the ideal case (i.e. no noise). For arbitrary pilots i and j:

$$\theta_i = f_i \cdot T \text{ and } \theta_j = f_j \cdot T$$

where $\theta$ is the phase, f is the frequency, and T is the period. From these equations the following relationship can be derived:

$$\frac{\theta_j}{\theta_i} = \frac{f_j}{f_i}$$

Therefore, it will be understood by one skilled in the art that the same idea of crossover detection, which utilizes the known phase relationship between pilot carriers, can be applied to any number of other systems.

Regardless of the particular mechanism used, after tdp is evaluated for each pilot, the least squares fit of the total delta pilot phases (tdp) is determined. The least squares fit produces a slope and a phase intercept (i.e., the tdp for the 0 data subcarrier) that allows simple calculation of the tdp of each data subcarrier by evaluating the equation of a line. The tdp for any data subcarrier is simply $tdp_i = (\text{slope})i + \text{phase intercept}$. The slope is the variable EstimatedSlope below, and the phase intercept is the variable EstimatedOffset below. The equations for the least squares fit of n data points are:

$$EstimatedSlope = \frac{\sum X_i Y_i - \frac{1}{n}\sum X_i \sum Y_i}{\sum X_i^2 - \frac{1}{n}(\sum X_i)^2}$$

$$EstimatedOffset = \frac{1}{n}\left(\sum Y_i - EstimatedSlope \sum X_i\right)$$

$X_i$ are subcarrier numbers which have the values (-21,-7,7,21). $Y_i$ are the total delta pilot phases, and n=4. The above equations can be simplified because the pilot subcarriers are constant (-21,-7,7,21). Thus, $$\sum X_i = -21-7+7+21 = 0$$

$$\sum X_i^2 = (-21)^2 + (-7)^2 + 7^2 + 21^2 = 980$$

$$\sum X_i Y_i = -21 tdp_0 - 7 tdp_1 + 7 tdp_2 + 21 tdp_3$$

Applying the above simplifications, results in $$EstimatedSlope = \frac{-3tdp_0 - tdp_1 + tdp_2 + 3tdp_3}{140}$$

$$EstimatedOffset = \frac{1}{4}(tdp_0 + tdp_1 + tdp_2 + tdp_3)$$

Where, $tdp_0$ is the total delta pilot phase for subcarrier -21, $tdp_1$ is the total delta pilot phase for subcarrier -7, $tdp_2$ is the total delta pilot phase for subcarrier 7, and $tdp_3$ is the total delta pilot phase for subcarrier 21.

According to one embodiment, in the event a pilot magnitude is low, its phase is determined by either interpolation or extrapolation from the phases of its two neighboring pilots and then the least squares fit is performed using the equations above as when all pilots are present and have sufficiently large magnitudes. Generally it should be understood that less than all available pilots may be used for analysis of the channel. For example, alternatively, a different least squares equation can be implemented for each of the four cases in which a pilot is ignored (i.e., only three points are used).

If $tdp_0$ is to be discarded, $tdp_0 = 2tdp_1 - tdp_2$.
If $tdp_1$ is to be discarded, $tdp_1 = (tdp_0 + tdp_2)/2$.
If $tdp_2$ is to be discarded, $tdp_2 = (tdp_1 + tdp_3)/2$.
If $tdp_3$ is to be discarded, $tdp_3 = 2tdp_2 - tdp_1$.

According to one embodiment the EstimatedSlope and EstimatedOffset are used to adjust the inverted channel estimate. The tdp for the $i^{th}$ data subcarrier can be determined using the following equation: $tdp_i = (\text{EstimatedSlope}) i + \text{EstimatedOffset}$, where i is between -26 and +26. For each data carrier a vector with an angle equal to $-tdp_i$ is provided to multiply unit 730. Unit 730 multiplies each of the data carriers in the inverted channel estimate, produced by multiply unit 720, by its corresponding vector with angle equal to $-tdp_i$. The output of unit 730 is an inverted channel estimate that has been adjusted for magnitude, frequency offset, timing drift, and phase noise.

According to one embodiment, the EstimatedOffset is stored for the previous two data symbols so that the EstimatedOffset can be filtered and the filtered offset can be used to determine the correction needed for each data subcarrier of each data symbol. This means that the first data symbol and the SIGNAL symbol do not have filtering. The EstimatedOffset for the previous two data symbols is indicated by offset(i-1) and offset(i-2). The EstimatedOffset for the current symbol i is indicated by offset(i). The filtered offset, according to one embodiment, is given by the equation below.

$$offsetfiltered_i = \frac{offset(i)}{2} + \frac{offset(i-1)}{4} + \frac{offset(i-2)}{4}$$

According to one embodiment, the EstimatedSlope is filtered and the EstimatedSlope for the previous two symbols is stored. The filtered EstimatedSlope is used to determine the correction needed for each data subcarrier of each data symbol. The filter, according to one embodiment, is the same as the offset filter with the exception that timing adjustments between symbols affects how the slopes before the timing adjustments are handled. When a timing adjustment is made, the slope is expected to change by $\pi/64$. Delaying by a sample produces $+\pi/64$, advancing by a sample produces $-\pi/64$. Without timing adjustments, the filter is simply:

$$slopefiltered_i = \frac{slope(i)}{2} + \frac{slope(i-1)}{4} + \frac{slope(i-2)}{4}$$

With a timing adjustment between symbol 'i-1' and 'i', slope(i-1) and slope(i-2) should be adjusted by $+/-\pi/64$. With weights of ¼ and ¼ for slope(i-1) and slope(i-2), the net effect is $+/-\pi/128$. With a timing adjustment between symbol 'i−2' and 'i−1', slope(i−2) should be adjusted by $+/-\pi/64$. With a weight of ¼ for slope(i−2), the net effect is $+/-\pi/256$.

Timing adjustments based on 'i−3' pilots will take effect between symbols 'i−2' and 'i−1'. Timing adjustments based on 'i−2' pilots will take effect between symbols 'i−1' and 'i'. The hardware must remember the previous three timing adjustments. The slope is expected to increase or decrease as a function of the frequency offset between transmitter and receiver. The frequency offset implies a timing offset drift, which ultimately is responsible for the change in slope. Since this frequency offset is estimated, this estimate may be used to remove the bias caused by the one-sided filters. However, even at 40 parts per million in frequency error between the receiver and transmitter, the error incurred for the most extreme frequency subcarrier (+/−26), is only 0.35 degrees, and so may be ignored according to one embodiment.

In order to further improve channel estimates, non-linear filtering can be employed to filter the slope and offset of the pilot carriers before channel correction.

Once the EstimatedOffset and the EstimatedSlope have been filtered and offsetfiltered and slopefiltered computed, the estimated tdp for any data carrier is simply calculated by $tdp_i = (\text{slopefiltered})i + \text{offsetfiltered}$, where i is between −26 and +26. For each data carrier a vector with an angle equal to $-tdp_i$ is provided to multiply unit 730. Unit 730 multiplies each of the data carriers in the inverted channel estimate, produced by multiply unit 720, by its corresponding vector with angle equal to $-tdp_i$. The output of unit 730 is an inverted channel estimate that has been adjusted for magnitude, frequency offset, timing drift, and phase noise.

As indicated above, timing adjustments may be necessary when the sampling is off by a clock. The timing uncertainty can be inferred by unit 710 from the slope of the pilots. The pilots will have a slope because it is desirable to sample the data symbols several samples early. According to one embodiment, a timing_backoff register specifies the number of samples to back off from the end of each symbol. Consequently, the pilots will have an expected slope which, for a flat channel, is simply $-(\pi)\text{timing\_backoff}/64$. However, the transmitter may have a faster or slower clock than the receiver.

With a positive frequency offset, the transmitter has a faster clock, and the receiver will keep slipping later, making the slope flatter. Whenever the slope becomes flat enough, as indicated by the condition below, the timing_adjustment is set to −1 by unit 710. The value $\pi/128$ is referred to herein as a timing threshold.

$$\text{slope} + (\pi)\text{timing\_backoff}/64 >= \pi/128$$

With a negative frequency offset, the transmitter has a slower clock. The receiver will keep advancing earlier, making the slope steeper. Whenever the slope becomes steep enough, as indicated by the condition below, the timing_adjustment is set to +1 by unit 710.

$$\text{slope} + (\pi)\text{timing\_backoff}/64 < \pi/128$$

According to one embodiment the residual frequency offset between the receiver and the transmitter, after the fine offset estimate has been calculated, is estimated by pilot tracking unit 710 using the offsetfiltered for two or more symbols. The residual frequency offset is calculated according to one embodiment using the following equation:

$$\text{Residual frequency offset} = (\text{offsetfiltered}_{y+Numsymbols} - \text{offsetfiltered}_y)/(160 * \text{Numsymbols})$$

$160*\text{Numsymbols}$ is the number of clocks over which the phase measurement is made: depending on the modulation used, the Numsymbols can be 2, 4, 8, 16 symbols. The present invention is not limited to the aforementioned values for Numsymbols. One of ordinary skill should appreciate that Numsymbols is application dependent. The residual frequency offset is provided to signal generator 522. According to one embodiment, $\text{offsetfiltered}_{y+numsymbols}$ is the filtered offset for a symbol Numsymbols symbols later than $\text{offsetfiltered}_y$, the filtered offset for the first data symbol in a frame. According to an alternative embodiment, $\text{offsetfiltered}_y$ is the filtered offset for the second long symbol. It should be appreciated that alternative embodiments are possible and encompassed by the present invention. The residual frequency offset equation provided above can be used for any two symbols for which a filtered offset has been determined.

Methods and systems for implementing techniques such as non-linear filtering and crossover detection algorithms in the tracking of pilot signals in order to, for example, maintain an accurate channel estimate in the presence of errors due to magnitude changes in the received signal, frequency offset between receiver and transmitter, timing drift, and phase noise have been described.

The present invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method acts of the invention can be performed by a programmable processor executing a program of instructions to perform functions of the invention by operating on input data and generating output. The invention can be implemented advantageously in one or more computer programs that executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Although the present invention has been particularly described with reference to the preferred embodiments, it should be readily apparent to those of ordinary skill in the art that changes and modifications in the form and details may be made without departing from the spirit and scope of the invention. It is intended that the appended claims include such changes and modifications.

What is claimed is:

1. In a communication system in which a communication signal is sent from a transmitter to a receiver, the communication signal being defined into a series of successive sampling intervals at the receiver, each sampling interval having a plurality of modulated carriers at a corresponding plurality of frequencies, a method of correcting a phase value for a received modulated carrier at a pilot frequency, the method comprising:

for each modulated carrier received at a pilot frequency, updating a corresponding phase value, the phase value being related to an initial training modulated carrier received at the pilot frequency;

applying a non-linear filter function to one or more prior delta pilot phase values corresponding to one or more respective prior modulated carriers received at the pilot frequency to generate a filtered result value that resolves phase ambiguity; and correcting the phase value if a difference of the phase value and the filtered result value exceeds a threshold value in absolute magnitude.

2. The method according to claim 1, wherein the phase value is a total change in pilot phase value that tracks, for each successive sampling interval, the total change in pilot phase at the pilot frequency since one or more initial training sampling intervals of the series of successive sampling intervals.

3. The method according to claim 1, wherein the step of correcting performs one of:

adding a phase correction value to the phase value; and
subtracting the phase correction value from the phase value.

4. The method according to claim 3, wherein the phase correction value is equal to $2\pi$ radians.

5. The method according to claim 3, further comprising:

adjusting non-pilot frequency modulated carrier phase values using one or more corrected phase values for respective pilot frequencies; and obtaining an estimate of an OFDM channel using the adjusted non-pilot frequency modulated carrier phase values and the corrected phase values.

6. The method according to claim 3, further comprising:

performing the steps of updating, applying, and correcting for each pilot frequency of the corresponding plurality of pilot frequencies;

obtaining an estimate of an OFDM channel using less than all of the corresponding corrected phase values for the corresponding plurality of pilot frequencies.

7. The method according to claim 3, further comprising:

for each modulated carrier received at a pilot frequency, tracking a phase difference using the corresponding phase value, the phase difference being between a corresponding modulated carrier phase and an initial training phase derived from at least the initial training modulated carrier received at the pilot frequency.

8. The method according to claim 7, wherein each corresponding modulated carrier phase and the initial training phase are limited to the range of $-\pi$ to $+\pi$.

9. The method according to claim 8, wherein prior to the step of correcting, the phase difference tracked by the phase value may differ from an actual phase difference by $+/-2\pi$.

10. The method according to claim 9, wherein the step of applying uses a median filter function.

11. The method according to claim 1, wherein each sampling interval is a data symbol.

12. The method according to claim 1, wherein each sampling interval is a data tone.

13. In a communication system in which a communication signal is sent from a transmitter to a receiver, the communication signal being defined into a series of successive sampling intervals at the receiver, each sampling interval having a plurality of modulated carriers at a corresponding plurality of frequencies, including N modulated carriers at N corresponding pilot frequencies, a method of correcting, for a given sampling interval, one or more phase values of N phase values, the N phase values corresponding to the N modulated carriers, the method comprising:

establishing an expected order of the N phase values, the expected order based on the N pilot frequencies without noise;

for each sampling interval, examining an actual order of the N phase values with noise; and if the actual order does not correspond to the expected order, then adjusting one or more of the N phase values until the actual order corresponds to the expected order.

14. The method according to claim 13, wherein the expected order and the actual order arrange the N phase values according to the magnitudes of the N phase values.

15. The method according to claim 13, wherein the phase value is a total change in pilot phase value that tracks, for each successive sampling interval, the total change in pilot phase at the pilot frequency since one or more initial training sampling intervals of the series of successive sampling intervals.

16. The method according to claim 13, wherein the step of adjusting further comprises:

if, according to the expected order, a first phase value should be greater than a second phase value, and the first phase value is less than the second phase value in the actual order, then adding a phase correction value to the first phase value unless adding the phase correction value would result in the first phase value being greater than any phase value that according to the expected order the first phase value should be less than.

17. The method according to claim 13, wherein the step of adjusting further comprises:

if according to the expected order, a first phase value should be less than a second phase value, and the first phase value is greater than the second phase value in the actual order, then subtracting a phase correction value from the first phase value unless subtracting the phase correction value would result in the first phase value being less than any phase value that according to the expected order the first phase value should be greater than.

18. The method according to claim 13, wherein the step of adjusting further comprises:

if according to the expected order, a first phase value should be greater than any other phase value and a second phase value should be greater than any other phase value except the first phase value, and the first phase value is less than the second phase value in the actual order, then subtracting a phase correction value from the second phase value if subtracting the phase correction value would result in the second phase value being greater than any other phase value except the first phase value, otherwise adding the phase correction value to the first phase value if the first phase value is less than any other phase value except the second phase value.

19. The method according to claim 13, wherein the step of adjusting further comprises:
  if according to the expected order, a first phase value should be less than any other phase value and a second phase value should be less than any other phase value except the first phase value, and the first phase value is greater than the second phase value in the actual order, then
    adding a phase correction value to the second phase value if adding the phase correction value would result in the second phase value being less than any other phase value except the first phase value, otherwise
    subtracting the phase correction value from the first phase value if the first phase value is greater than other phase value except the second phase value.

20. The method according to claim 13, further comprising the step of:
  calculating an ideal gap value between the pilot frequencies of the N pilot frequencies, the ideal gap value being based at least in part on a number of samples by which each sampling interval is sampled early or late.

21. The method according to claim 20, wherein the step of calculating the ideal gap value assumes no phase noise is present.

22. The method according to claim 20, wherein the phase correction value is selected according to the ideal gap value.

23. The method according to claim 20, wherein the phase correction value is equal to $2\pi$ radians.

24. The method according to claim 13, wherein each sampling interval is a data symbol.

25. The method according to claim 13, wherein each sampling interval is a data tone.

26. The method according to claim 13, wherein the communication system is an OFDM wireless communication system.

27. In a communication system in which a communication signal is sent from a transmitter to a receiver, the communication signal being defined into a series of successive sampling intervals at the receiver, each sampling interval having a plurality of modulated carriers at a corresponding plurality of frequencies, including N modulated carriers at N corresponding pilot frequencies, a method of performing, for a given sampling interval, crossover detection and correction of one or more of N phase values, the N phase values corresponding to the N modulated carriers, the method comprising:
  calculating N phase values for each sampling interval,
  determining whether the N phase values are in a predetermined order, the predetermined order based on the N corresponding pilot frequencies without noise; and
  if the N phase values are not in the predetermined order due to noise, then reordering the N phase values until the N phase values are in the predetermined order by performing one or more of:
    adding a phase correction value to one or more of the N phase values, and
    subtracting the phase correction value from one or more of the N phase values.

28. The method according to claim 27, wherein the phase value is a total change in pilot phase value that tracks, for each successive sampling interval, the total change in pilot phase at the pilot frequency since one or more initial training sampling intervals of the series of successive sampling intervals.

29. The method according to claim 27, wherein the phase correction value is equal to $2\pi$ radians.

30. The method according to claim 27, wherein each sampling interval is a data symbol.

31. The method according to claim 27, wherein each sampling interval is a data tone.

32. The method according to claim 27, wherein the communication system is an OFDM wireless communication system.

33. In a communication system in which a communication signal is sent from a transmitter to a receiver, the communication signal being defined into a series of successive sampling intervals at the receiver, each sampling interval having a plurality of modulated carriers at a corresponding plurality of frequencies, including N modulated carriers at N corresponding pilot frequencies, a computer readable storage medium at the receiver to perform for a given sampling interval, crossover detection and correction of one or more of N phase values, the N phase values corresponding to the N modulated carriers, the computer readable storage medium having thereon instructions which when executed result in the following steps being performed:
  calculating N phase values for each sampling interval,
  determining whether the N phase values are in a predetermined order, the predetermined order based on the N corresponding pilot frequencies without noise; and
  if the N phase values are not in the predetermined order due to noise, then reordering the N phase values until the N phase values are in the predetermined order by performing one or more of:
    adding a phase correction value to one or more of the N phase values, and
    subtracting the phase correction value from one or more of the N phase values.

34. In a communication system in which a communication signal is sent from a transmitter to a receiver, an apparatus at the receiver to correct a phase value for a received modulated carrier at a pilot frequency, the communication signal being defined into a series of successive sampling intervals at the receiver, each sampling interval having a plurality of modulated carriers at a corresponding plurality of frequencies, the apparatus comprising:
  means for updating, for each modulated carrier received at a pilot frequency, a corresponding phase value, the phase value being related to an initial training modulated carrier received at the pilot frequency;
  a non-linear filter to apply a non-linear filter function to one or more prior delta pilot phase values corresponding to one or more respective prior modulated carriers received at the pilot frequency to generate a filtered result value that resolves phase ambiguity; and
  means for correcting the phase value if a difference of the phase value and the filtered result value exceeds a threshold value in absolute magnitude.

35. In a communication system in which a communication signal is sent from a transmitter to a receiver, the communication signal being defined into a series of successive sampling intervals at the receiver, each sampling interval having a plurality of modulated carriers at a corresponding plurality of frequencies, including N modulated carriers at N corresponding pilot frequencies, an apparatus at the receiver to perform, for a given sampling interval, crossover detection and correction of one or more of N phase values, the N phase values corresponding to the N modulated carriers, the apparatus comprising:
  means for calculating N phase values for each sampling interval, means for determining whether the N phase values are in a predetermined order, the predetermined order based on the N corresponding pilot frequencies without noise; and means for reordering, if the N phase values are not in the predetermined order due to noise, the N phase values until the N phase values are in the predetermined order by performing one or more of:
adding a phase correction value to one or more of the N phase values, and
subtracting the phase correction value from one or more of the N phase values.

36. A method for maintaining an accurate channel estimate, the method comprising:
providing a reference channel estimate based on at least one first symbol;
generating a frequency domain representation of a second symbol including a plurality of pilots;
tracking phase change in the plurality of pilots of the second symbol relative to pilots of the at least one first symbol to produce correction factors, wherein tracking phase change includes using a nonlinear filter to correct for phase ambiguity in a phase value; and
adjusting the reference channel estimate based upon the correction factors.

37. The method according to claim 36, wherein the phase value is a total change in pilot phase value that tracks, for each successive symbol of a series of successive symbols that includes the at least one first symbol and the second symbol, the total change in pilot phase at a corresponding pilot frequency since the at least one first symbol.

38. The method according to claim 37, wherein tracking phase change includes, for each successive symbol of the series of successive symbols, calculating N phase values at N corresponding pilot frequencies, and adjusting the N phase values to ensure that the N phase values are ordered according to an expected order, the expected order based on the N corresponding pilot frequencies, the N phase values including the phase value.

39. The method of claim 36, wherein the at least one first symbol comprises at least one training symbol.

40. The method of claim 36, wherein tracking phase change includes determining for each pilot in the second symbol an associated total amount of rotation relative to a corresponding pilot in the at least one first symbol.

41. The method of claim 40, wherein tracking phase change includes determining a least squares fit based on the associated total amount of rotation for each pilot in the second symbol.

42. The method of claim 41 wherein tracking phase change includes generating, based on the least squares fit, second correction factors.

43. The method of claim 42, wherein tracking phase change includes determining a slope and a phase intercept based upon the least squares fit, and wherein generating, based on the least squares fit, includes generating the second correction factors based upon subcarrier numbers, the phase intercept, and the slope.

44. A method for maintaining an accurate channel estimate, the method comprising:
generating a frequency domain representation of at least one training symbol;
determining a number of clock cycles that the at least one training symbol is sampled early;
generating first correction factors based on the number of clock cycles;
adjusting the frequency domain representation based upon the first correction factors to produce a reference channel estimate;
generating a frequency domain representation of a first data symbol;
tracking phase change in pilots of the first data symbol relative to pilots of the at least one training symbol to produce second correction factors, wherein tracking phase change includes calculating N phase values at N corresponding pilot frequencies at the first data symbol and adjusting the N phase values to ensure that the N phase values are ordered according to an expected order, the expected order based on the N corresponding pilot frequencies; and
adjusting the reference channel estimate based upon the second correction factors.

45. The method according to claim 44, wherein the phase value is a total change in pilot phase value that tracks, for each successive symbol of a series of successive symbols that includes the at least one first symbol and the second symbol, the total change in pilot phase at a corresponding pilot frequency since the at least one first symbol.

46. The method according to claim 44, wherein calculating each phase value of the N phase values includes using nonlinear filtering to correct for phase ambiguity in the phase value.

47. The method of claim 44, wherein adjusting results in pilot signals in the frequency domain representation of the at least one training symbol having a substantially flat phase response.

48. The method of claim 44, wherein tracking phase change includes determining for each pilot in the first data symbol an associated total amount of rotation relative to a corresponding pilot in the at least one training symbol.

49. The method of claim 48, wherein tracking phase change includes determining a least squares fit based on the associated total amount of rotation for each pilot.

50. The method of claim 49, wherein tracking phase change includes generating, based on the least squares fit, the second correction factors.

51. The method of claim 50, wherein tracking phase change includes
determining a slope and a phase intercept based upon the least squares fit, and
wherein generating, based on the least squares fit, includes generating the second correction factors based upon subcarrier numbers, the phase intercept, and the slope.

52. An apparatus for maintaining an accurate channel estimate, the apparatus comprising:
a frequency domain transform unit that is to generate a frequency domain representation of at least one training symbol and a frequency domain representation of a first data symbol;
an early sampling detection circuit that is to determine, based on the frequency domain representation of the at least one training symbol, a number of clock cycles that the at least one training symbol is sampled early;
an angle-to-vector converter that is to produce a plurality of first correction factors based on the number of clock cycles;
a first multiplier that is to adjust the frequency domain representation based upon the first correction factors to produce a reference channel estimate;
a pilot phase tracking circuit that is to determine for each pilot in the first data symbol an associated total amount of rotation relative to a corresponding pilot in the at least one training symbol and to adjust the associated total amount of rotation for each pilot to ensure that the associated total amounts are ordered according to an expected order, the expected order based on the pilots, in order to produce a plurality of second correction factors; and a second multiplier that is to adjust the reference channel estimate based upon the plurality of second correction factors.

53. An apparatus for maintaining an accurate reference channel estimate, the apparatus comprising:

a memory that stores the reference channel estimate;

a pilot phase tracking circuit to receive pilots of at least one training symbol and pilots of a first data symbol, to determine for a plurality of the pilots in the first data symbol an associated total amount of rotation relative to a corresponding pilot in the at least one training symbol, to determine a least squares fit based on the associated total amount of rotation for each pilot of the plurality of the pilots in the first data symbol, and to produce a plurality of first correction factors based on the least squares fit, the pilot phase tracking circuit comprising, for each pilot of the plurality of pilots, a corresponding non-linear filter to provide the corresponding associated total amount of rotation without phase ambiguity; and a multiplier that is to adjust the reference channel estimate based upon the plurality of first correction factors.

54. An apparatus for maintaining an accurate reference channel estimate, the apparatus comprising:

a memory that stores the reference channel estimate;

a pilot phase tracking circuit to receive pilots of at least one training symbol and pilots of a first data symbol, to determine for a plurality of the pilots in the first data symbol an associated total amount of rotation relative to a corresponding pilot in the at least one training symbol, to determine a least squares fit based on the associated total amount of rotation for each pilot of the plurality of the pilots in the first data symbol, and to produce a plurality of first correction factors based on the least squares fit, the pilot phase tracking unit adjusting and reordering initial values of the associated total amount of rotation for the plurality of pilots to provide the corresponding associated total amount of rotation in accordance with an expected order based on the plurality of pilots; and a multiplier that is to adjust the reference channel estimate based upon the plurality of first correction factors.

* * * * *